US012374308B2

United States Patent
Mertens

(10) Patent No.: US 12,374,308 B2
(45) Date of Patent: Jul. 29, 2025

(54) MIXING SECONDARY GRAPHICS ELEMENTS IN HDR IMAGES

(71) Applicant: KONINKLIJKE PHILIPS N.V., Eindhoven (NL)

(72) Inventor: Mark Jozef William Mertens, Valkenswaard (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/868,239

(22) PCT Filed: May 9, 2023

(86) PCT No.: PCT/EP2023/062204
§ 371 (c)(1),
(2) Date: Nov. 22, 2024

(87) PCT Pub. No.: WO2023/227360
PCT Pub. Date: Nov. 30, 2023

(65) Prior Publication Data
US 2025/0174211 A1    May 29, 2025

(30) Foreign Application Priority Data
May 24, 2022 (EP) .................................... 22175149

(51) Int. Cl.
*G06T 5/90* (2024.01)
*G09G 5/02* (2006.01)

(52) U.S. Cl.
CPC ......... *G09G 5/026* (2013.01); *G09G 2340/10* (2013.01)

(58) Field of Classification Search
CPC ... G06T 2207/20208; G06T 5/92; G06T 5/90; G06T 2207/20221; G09G 5/026; G09G 2340/10; G09G 2340/12; G09G 5/377
See application file for complete search history.

(56) References Cited

U.S. PATENT DOCUMENTS

| 2016/0080716 A1 | 3/2016 | Atkins et al. |
| 2018/0018932 A1 | 1/2018 | Atkins |

(Continued)

FOREIGN PATENT DOCUMENTS

WO    2015180854 A1    12/2015

OTHER PUBLICATIONS

International Search Report and Written Opinion from PCT/EP2023/062204 mailed Aug. 23, 2023.

(Continued)

*Primary Examiner* — Hau H Nguyen

(57) ABSTRACT

To get much better predictable graphics insertion, with better coordinating of the pixel luminances respectively their coded lumas of primary and secondary graphics elements inserted at different times in a HDR video, the inventor proposes a method (or apparatus) of determining in a circuit for processing digital images second lumas of pixels of a secondary graphics image element (216) to be mixed with at least one high dynamic range input image (206), the method comprising: receiving a high dynamic range image signal (S_im) comprising the at least one high dynamic range input image, characterized in that the method comprises:—analyzing the high dynamic range image signal to determine a range of primary graphics lumas (R_gra) of a primary graphics element of the at least one high dynamic range input image, which is a sub-range of a range of luminances of the high dynamic range input image, wherein the determining a range of primary graphics lumas comprises determining a lower luma (Y_low) and an upper luma (Y_high) specifying endpoints of the range of primary graphics lumas (R_gra): —luminance mapping the secondary graphics element with at least a brightest subset of its pixel lumas comprised in the range of graphics lumas; and—mixing the (Continued)

secondary graphics image element with the high dynamic range input image.

16 Claims, 8 Drawing Sheets

(56) References Cited

U.S. PATENT DOCUMENTS

2018/0336669 A1* 11/2018 Mertens ............ H04N 5/265
2020/0193935 A1   6/2020 Van De Kerkhof et al.

OTHER PUBLICATIONS

Sahli et al "Model Based Car Tracking Through the Integration of Search and Estimation" Proc. SPIE 2264, Enhanced and Synthetic Vision 1998.
Mertens et al "A Robust Non linear Segment Edge Finder" Vrije Universiteit Brussel, Dept. of Electronics.

* cited by examiner 301    302

401　　　　　　　　402

MIXING SECONDARY GRAPHICS ELEMENTS IN HDR IMAGES

CROSS-REFERENCE TO PRIOR APPLICATIONS

This application is the U.S. National Phase application under 35 U.S.C. § 371 of International Application No. PCT/EP2023/062204, filed on May 9, 2023, which claims the benefit of EP Patent Application No. EP 22189158.3, filed on Aug. 7, 2022 and EP Patent Application No. EP 22175149.8, filed on May 24, 2022. These applications are hereby incorporated by reference herein.

FIELD OF THE INVENTION

The invention relates to methods and apparatuses of constructing high dynamic range (HDR) images, which is a novel way of encoding images compared to the standard low dynamic range images, which specifically comprise graphics elements. Specifically the invention may cater for more advanced HDR applications, which involve luminance or tone mapping, which may potentially be specified differently per different scene image of a video, so that secondary color gradings of different luminance dynamic range ending at different maximum luminance may be calculated from input images having a primary grading (grading typically comprises the re-distribution of normalized luminances of pixels of various objects in an image from a starting relative value in the input image, to a different relative value in an output image; the relative re-distribution also affecting absolute luminance values of pixels, if associated with normalized luminances). Specifically the present invention may be useful when secondary graphics elements need to be mixed by some video processing apparatus in previously created HDR images (the secondary graphics elements should be distinguished from primary graphics elements, which are already present in the image(s) before the mixing of at least one secondary graphics element).

BACKGROUND OF THE INVENTION

Until the first research around 2010 (and before deployment of first purchasable HDR decoding tv's in 2015), at least for video all videos were made according to the universal Low Dynamic Range (LDR) a.k.a. Standard Dynamic Range (SDR) encoding framework. This had a number of properties. Firstly, there was only one video made, which was good for all displays. The system was relative, with white being the maximum (100%) signal, encoded with maximum luma code (255 in 8 bit YCbCr encoding), corresponding to maximum non-linear RGB values: R'=G'=B'=255. There was nothing brighter than white, but all typical reflective colors can be represented as being darker than such brightest white (e.g. a piece of paper will also at most reflect all incoming light, or absorb some of the red wavelengths leaving the blue and green to reflect back to the eye resulting in a cyan local color, which is by definition somewhat darker than the paper white). Each display displayed this whitest white (as "driving request") as whichever brightest color it was technically constructed to render, e.g. 80 nit (which is the easier written name of the SI quantity Cd/m^2) on a computer monitor, and 200 nit on an LCD display with TL backlight. The viewer's eye quickly compensated for the difference in brightness, so when not side by side in a shop, at home all viewers saw approximately the same image (despite differences in display).

One wanted to improve on the perceivable look of the image, by making not just colors as they could be printed or painted on paper, but real glowing pixels, much brighter than the "paper white" a.k.a. "diffuse white". In practice, that would e.g. mean that, whereas in the old days one made images like in a studio and everything of importance well-lit from a battery of lamps on the ceiling, one could now simply shoot against strong backlighting, and make it look good. Cameras kept improving so they could simultaneously capture a number of scene luminances sufficient for many scenarios, and the brightness could be further tuned or supplemented in the computer, and displays keep getting better too, even the consumer television displays.

Some systems, like BBC's Hybrid Loggamma (HLG), do this by defining in the coded image values above white (white being given the reference level of "1", or 100%), e.g. up to 10× white, which could define 10× more brightly glowing pixels to be displayed.

Most systems by now have also moved to a paradigm in which the video creator can define absolute nit values (i.e. not 2× or 10× compared to the undefined white level which gets converted to a variable actual nit output on each end-point display) for his image, on an elected target display dynamic range capability. The target display is a virtual (intended) display at the video creation side, e.g. a 4000 nit (ML_C) target display for defining a 4000 nit specific video, and any actual consumer's end-point display may have a lower display maximum luminance (ML_D), e.g. 750 nit. In such a situation, the end-display would still need to contain luminance re-mapping hardware or software, which is typically realized as luma mapping, which somehow conformizes the pixel luminances in the HDR input image which have too high a luminance dynamic range (specifically its maximum luminance) to be faithfully displayed, to values in the end-display dynamic range. The simplest mapping simply clips all luminances above 750 nit to 750 nit, but that is the worst manner of handling the dynamic range mapping, since then the beautiful structure in a 4000 nit image of a sunset having sunlit clouds in the range of e.g. 1000-2000 nit clips away, and displays as a white uniform 750 patch. Better luma mappings would move the 1000-2000 nit sub-range in the HDR input image to e.g. 650-740 of the end-display dynamic range, by a suitably determined function (which can be determined either autonomously inside the receiving apparatus, e.g. a tv, STB and the like; or determined by the video creator as most suitable for his artistic movie or program, and co-communicated with the video signal, e.g. as standardized format metadata). Luma means any encoding of the luminance, e.g. in 10 bit, with a function which allocates the 0-1023 luma codes to the e.g. 0.001-4000 nit video luminances, by means of a so-called Electro-Optical Transfer function (EOTF).

The simplest systems are merely transmitting (with a suitably defined EOTF) the HDR e.g. 4000 nit max. luminance image per se (i.e. supplying to receivers an image, but not e.g. indicating how it should be down-graded by luminance mapping for lower maximum luminance capability displays). This is what the HDR10 standard does. More advanced systems, like HDR10+, may also communicate a function for down-mapping the 4000 nit image to lower dynamic range, e.g. 750 nit. They make this easy by defining a mapping function between two different maximum luminance version images of the same scene image, or reference gradings, and then using an algorithm to calculate a deformed version of that reference luminance or luma mapping function to calculate other luminance mapping functions, e.g. to calculate endpoint functions for other display maximum luminances (e.g. the reference luminance mapping function may specify how to change the distribution of normalized luminances in a 2000 nit input image, e.g. a master HDR graded video created by the creator, to get a 100 nit reference video, and a display adaptation algorithm calculates on the basis of the reference luminance mapping function a final luminance mapping function, so that a 700 nit television can map the 0-2000 nit luminances to output to be displayed luminances within its 0-700 nit range). E.g., if one agrees to define SDR images, when newly interpreted not as relative images but also absolute-nit images, always to go to a maximum pixel luminance of 100 nit, the video creator can define and co-communicate a function specifying how to map the 0.001 (or 0)-4000 nit luminances, being the first reference image grading, to the corresponding desired SDR 0-100 nit luminances (being the secondary reference grading), which is called display tuning or adaptation. If one defines a function which boosts the darkest 20% of the colors, in a normalized to 1.0 plot for both 4000 nit ML_C input image (horizontal axis) and 100 nit ML_C secondary grading/reference image, by say a factor 3, i.e. when going down from 4000 nit all the way to 100 nit, if one needs to go down to 750 nit in some specific end-user tv, the needed boost may be e.g. only 2× (depending on which definition EOFT one uses for the lumas, since as mentioned the luminance mapping is typically realized in practice in the color processing IC/pipeline as a luma mapping, e.g. using a psychovisually uniformized EOTF, as this allows defining the impact of luminance changes along the range more visually uniformly, i.e. more relevant and visually impactful for humans).

A third class of even more advanced HDR encoders, take this principle of defining re-grading desiderata based on two reference grading images to the next level, by re-stating it in another manner. If one limits oneself to using largely invertible functions, one can actually transmit the LDR image which can be calculated at the transmitting side by down-mapping the luminances or lumas of the e.g. 4000 nit HDR image to the SDR image, as a proxy for the actual master HDR image that was created by the video creator, e.g. a Hollywood studio for a BD or OTT supply, or a broadcaster of a sports program, etc. The receiving side apparatus can then apply the inverted function to reconstruct a close reconstruction of the master HDR image. Contrasting with the systems which communicate a HDR image itself (as it was created) which we will call "mode-HDR", the systems which communicate an LDR image will be called a "mode-LDR coding framework".

A typical example is shown in FIG. 1 (e.g. summarizing principles the present applicant previously patented in e.g. WO 2015/180854), including the decoding functionality per se, and the display adaptation as a following block, which two techniques should not be confused.

FIG. 1 schematically shows an exemplary video coding and communication, and handling (displaying) system. On the creation side, we show a typical encoder (100) embodiment. The skilled person understands we first show the per-pixel processing pipeline of the luminance processing (i.e. through which all pixels of an input HDR image Im_HDR (typically one of the several master HDR images of the video as created by the video creator, the creation details such as camera capturing and shading or offline color grading being omitted as they are understandable to the skilled person and don't improve this present elucidation) are sequentially processed), and thereafter the video processing circuits which operate on an entire image.

We assume we start from an HDR pixel luminance L_HDR (note some systems may already start working from lumas), which is sent through an elected HDR inverse EOTF in luma conversion circuit 101, to obtain a corresponding HDR luma Y_HDR. E.g., the Perceptual Quantizer EOTF may be used. This input HDR luma is luma mapped by luma mapper 102, to obtain a corresponding SDR luma Y_SDR. In this unit the creation-side apparatus applies the appropriate color changes including luminance re-grading appropriate for any specific scene image, e.g. maintaining an appropriate average brightness for a cave image, in the output image as corresponding to the color specifics of the input image. I.e. there will be an input connection UI to obtain a suitably determined shape of luma mapping function (LMF). E.g., when creating a lower maximum luminance output image for the cave image, a normalized version of the luma mapping function may need to boost the darkest lumas of the input by say a factor 2.0, e.g. as determined by a human color grader or automaton, which means the luma mapping function is concave or so-called r-shaped (as shown inside the rectangle representing unit 102).

Broadly speaking two classes can exist. Offline systems may employ a human color grader to determine according to his artistic preferences the best LMF via color grading software. We assume—without limitation—the LMF is defined as a LUT which is defined with the coordinates of a few node points (e.g. (x1, y1) for the first node point). The human grader may set the slope of the first line segment, i.e. the position of the first node point, because there is e.g. dark content in the image, and he wants to keep it sufficiently visible when displayed on lower dynamic range displays, e.g. specifically on the 100 nit ML_C image for a 100 nit ML_D LDR display.

A second class uses an automaton to obtain a secondary grading from a primary grading with different maximum luminance. Those automatons analyze the image, and propose a best LMF (e.g., they may use a neural network which was trained on image aspects of a set of training aspects, to yield in its output layer normalized coefficients of some parametric function, or any deterministic algorithm may be used). A specifically interesting automaton, the so-called inverse tone mapping (ITM), does not analyze the master HDR image, but rather an input LDR image at the creation side, and makes a pseudo-HDR image for this LDR image. This is very useful, because the majority of videos was show as LDR, and may even today or in the near future be generated as SDR (at least, e.g. some of the cameras in a multi-camera production may output SDR, e.g. a drone capturing side-footage of a sports game, and this side-footage may need to be converted to the HDR format of the main program). When suitably coupling the capabilities of the mode-LDR coding system with the ITM system, the present applicant and their partners have been able to define a system which can double-invert, i.e. the up-grading function of the pseudo-HDR image generated from the original LDR input, is substantially the inverse function of the LMF used when coding the LDR communication proxy. In this manner one can make a system which in fact communicates the original LDR image, but also information for making a good HDR image for it (and if the content creating customer so desires automatically, or in other versions also with human input, e.g. tweaking the automatic settings). The automaton may use all kinds of rules, e.g. determine where there are light sources in the image, which need a certain amount of relative brightening compared to the average image luminance, but the exact details are irrelevant for the present invention's discussion. What is important is that any system employing or cooperating with the present innovative embodiments can generate some luminance (or luma) mapping function LMF. The luma mapping function determined by the automaton can similarly be input via connection UI to be applied in the luma mapper 102. Note that in our simplest embodiment elucidation, there is simply one (downgrading) luma mapper 102. This need not be a limitation: since both the EOTF and the luma mapping typically map a normalized input domain [0,1] to a normalized output domain [0,1], there may be one or more intermediate normalized mappings which (substantially) map 0 input onto 0 output and 1 onto 1. In such a case the former, intermediate luma mapping then functions as a basic mapping, and (second in line) luma mapper 102 then functions as a corrective mapping, based on the first mapping.

The encoder now has obtained a set of LDR image lumas Y_SDR, which correspond to the HDR image lumas Y_HDR (via the mapping function). E.g., the darkest pixels in the scene may be so defined to be displayed as substantially the same luminance on HDR and SDR displays, but the brighter HDR luminances may be squeezed into the upper range of the SDR image, as is shown by the convex shape of the LMF function shown inside luma mapper 102, which reduces in slope (or reconverges towards the diagonal of the normalized axis system). Note that normalization is easily understood by the skilled person: one merely needs to divide the luma code by power(2; number_of_bits). Normalized luminances can also be defined if so desired, by dividing any pixel luminance by the maximum of its associated target display, ML_C, e.g. 4000 nit. I.e. the brightest possible pixel for the target display, completely using the capability of the associated target display by driving up to the target display's maximum luminance which is the upper point of its luminance dynamic range, is represented as a normalized luminance 1.0 (functioning as an input brightness value, shown on the horizontal axis of graphs like in unit 102). The skilled person can understand how one can as such represent various different normalizations to different maxima, and how one can specify functions which either map the normalized input values to normalized lumas (of any bit length, and any elected EOTF), or any normalized luminances (of any associated maximum luminance), on the vertical axis.

So one can mentally picture an example of an indoors-outdoors scene. Since in the real world, outdoors luminances are typically 100× more luminous than indoors pixels, a legacy LDR image will show the indoors objects nicely bright and colorful, but everything outside the window is hard-clipped to uniform white (i.e. invisible). Now, when communicating HDR videos with a reversible proxy image, we will make sure that the bright outside regions seen through the window become bright (maybe even desaturated), but in a controlled manner so that sufficient information is still available for reconstruction back to HDR. This has advantages for both outputs, since any system wanting to use the LDR images only as is, will still see a nice rendering of the outdoor scene, to the extent possible on a limited LDR dynamic range.

So the set of Y_SDR pixel luminances (together with their chrominances, the details of which are unnecessary for this elucidation) will form a "classical LDR image", in the sense that later circuitry need not always take particular care about whether this LDR image was smartly generated or simply straight from camera, as in the legacy LDR systems. Ergo, a video compressor 103 applies algorithms like e.g. a MPEG HEVC or VVC compression. This is a bundle of data reduction techniques, which inter alia uses discrete cosine transform to transform a block of e.g. 8×8 pixels into a limited set of spatial frequencies, which need less information to represent them. The amount of information needed may be regulated by determining a quantization factor, which determines how many DCT frequencies are retained and how accurately they are represented. The disadvantage is that the compressed LDR image (Im_C) is not as exact as the input SDR image (Im_SDR), in particular there will be block artefacts. Depending on the elections of the broadcaster, it may e.g. so severe that some blocks in the sky are represented only by their average luminance, so they may turn up as uniform squares. This will normally not be an issue, since the compressor will determine all its settings (comprising the quantization factors) in such a manner that the quantization errors are largely invisible to the human visual system, or at least unobjectionable.

Formatter 104 does whatever signal formatting is needed for the communication channel (which may be different when e.g. communicating via storage on a blu-ray disk, than when e.g. DVB-T broadcasting). In general all variants will have the property that the compressed video images Im_C are bundled together in the output image signal S_im with the luma mapping functions LMF, which may change per image (or not).

Deformatter 151 does the opposite of the formatting, so that compressed LDR images and functions LMF are obtained, to reconstruct the HDR images, or other useful dynamic range mapping processing can be done in later circuitry (e.g. optimization for a particular connected display). Decompressor 152 undoes the e.g. VVC or VP9 compression, to obtain a sequence of approximate LDR lumas Ya_SDR to be sent to the HDR image reconstruction pipeline. To perform substantially the inverse process of coding a to be communicated HDR video as a LDR proxy video, upgrading luma mapper 153 transforms the SDR lumas into reconstructed HDR lumas YR HDR (it uses the inverse luma mapping function ILMF, which is (substantially) the inverse of the LMF). We have shown in one elucidation figure two possible receiver (150) apparatuses, which may be present as dual functionality in one physical apparatus (wherein e.g. an end user can select which of the parallel processings to apply), or some apparatuses may have only one of the parallel processings (e.g. some set-top-boxes may only do reconstruction of the master HDR image, to store it in a memory 155, such as e.g. a hard disk).

If we have a display panel connected to the receiver embodiment, e.g. 750 nit ML_D end-user display 190, the receiver may have display adaptation circuitry 180 to calculate a 750 nit output image instead of the e.g. 4000 nit reconstruction image (we have shown this dotted, to show its an optional component, tangential to the present inventive teachings, although both techniques will often be used in combination). Without going into details about the many variants in which display adaptation can be realized, there is typically a function determination circuit 157, which will on the basis of the shape of the inverse of the LMF, propose an adapted luma mapping function F_ADAP (which will typically lie closer to the diagonal if the difference between the maximum luminance of the starting image and that of the desired image is less than the difference of the maximum luminances of the two reference gradings, e.g. the 4000 nit master HDR image, and the corresponding 100 nit LDR image). This function will be loaded into the display adaptation luma mapper 156 to calculate less boosted HDR lumas L_MDR, in typically a smaller dynamic range, ending at ML_D=750 nit instead of ML_C=4000 nit. With re-grading we mean any luminance (or luma) mapping from a first image of first dynamic range to a second image of second dynamic range, in which at least some pixels will be given different absolute or relative luminance (e.g. compressing the brightest lumas into a smaller sub-range for a smaller output dynamic range). Such a graded image may also be called a grading. If only reconstruction is needed, EOTF conversion circuit 154 will suffice, yielding reconstruction (or reconstructed) HDR image Im_R_HDR comprising pixel colors comprising reconstructed HDR luminances LR_HDR.

If video content only consisted of natural images (i.e. e.g. captured by a camera) then high dynamic range technology would already be complex in view of the various manners to calculate re-graded pixel luminances for input luminances. Additional complexity comes from the details of the various coding standards, which may even be present in a mix, i.e. e.g. some HDR10 video data needs to be mixed with a HLG capturing, say in a picture-in-picture.

In addition, typically content creators also want to add graphics to the images. With the term graphics we denote anything which is not a natural image element/region, i.e. typically more simplistic in nature, and usually having a more limited discrete set of colors (e.g. no photon noise). Another manner one can characterize graphics is that they do not form a part of the image which is similarly lit, but other considerations like easy readability or attention grabbing may be of importance. Graphics are typically computer-generated, and we typically mean graphics which are not naturalistic, like e.g. a CG piece of furniture which is visually indistinguishable from a piece of furniture that would have actually been in the camera-captured scene. E.g. one may have a bright logo of a company, or other graphics element such as a plot, weather map, information banner, etc.

Graphics started out in the old LDR days emulating the way graphical elements were made on paper. I.e., one typically had a limited set of pens, or crayons, etc. Indeed, in early systems like teletext, one initially defined 3 primary colors (Red, Green, Blue), two secondary colors (yellow Ye, cyan Cy, and magenta Mg), and black and white. Any graphic, like an information page about scheduled flights at an airport, had to be generated from graphics primitives (e.g. pixel blocks) of pixels having one of those 8 colors. "Red" (although needing to look reddish to a human viewer) however is not a uniquely defined color, in particular that it has no unique luminance predefined for it. More advanced color palettes might contain e.g. 256 pre-defined colors. E.g. graphical user interfaces like the X-windows system for Unix, in X11 defined a number of selectable colors, like e.g. "honeydew", or "gainsboro", or "lemon chiffon". These colors had to be defined, as some representative code yielding approximately a certain color appearance when displayed, and were defined in the LDR gamut as percentages of standard red, green and blue to be mixed. E.g. honeydew was made of 94% red, 100% green, and 94% blue (or hexcode #F0FFF0), and thus displayed as a light greenish white.

A problem is that although these colors are defined in a stable manner in the limited (and universal) LDR gamut, they are not defined or at least ill-defined in HDR images. And this has several origins. Firstly, there is only one kind of white in LDR, so one can define all graphics colors compared to that white. Indeed, just like when drawing with a suitably colored marker on the display white, functioning as a white canvas, the code mimicking the absorbing of certain hues defines the creation of a certain chromaticity (or color nuance, e.g. desaturated chartreuse). But in HDR there is no unique white. This is something one knows from the real world. If one looks at a white painted indoors wall, although perhaps having slight hints of grey at positions of shadow, all-in-all this has the visual impression to a human of looking white. But if one looks outside the window to a sunlit white garage door, this also looks as a color kind "white". But another much brighter white. In a high quality HDR handling system (handling typically involving such aspects as optimally creating, encoding, and processing for suitably displaying), one does not simply want to extend the LDR look with a few neat HDR aspects, but one may want to render the various kinds of white on a display also (although typically at lower luminance than in the real world). In technical terms, such considerations have inter alia led to the useful definition of a framework in which one can define various kinds of HDR image, with different coded maximum luminance ML_C, e.g. 1000 nit, or 5000 nit, etc.

Complicating the matter even more, the fact that there are different kinds of HDR image (with different ML_C; and even the relative systems have the same issues in general), means that luma mappings will be needed to map the luminances along the dynamic range of the input image to luminances along an output dynamic range, e.g. of an end-consumer display. The luminance mappings are typically defined and calculated as corresponding LUMA mapping functions, mapping the luma codes which uniquely represent luminances, e.g. via the Perceptual Quantizer EOTF. So e.g., imagine one needs to map input image luminances between 0 and 4000 to output luminances between 0 and 100, by function F_H2S_L, i.e. L_out=F_H2S_L(L_in). Both the input and output luminances can be represented as PQ-defined lumas, since the Perceptual Quantizer EOTF (EOTF_PQ) can encode luminances up to 10,000 nit. One finds Y_out=OETF_PQ (L_out), and L_in=OETF_PQ(L_in). Ergo, one can find a luma mapping F_H2S_Y as: Y_out=F_H2S_Y(Y_in)= F_H2S_Y(OETF_PQ(L_in)). Or, the luminance mapping function and the luma mapping function are related via: L_out=EOTF_PQ(Y_out)=EOTF_PQ[FH2S_Y(OETF_PQ (L_in))], ergo:

F_H2S_L=EOTF_PQ (o) F_H2S_Y (o) OETF_PQ, where (o) means function composition (usually denoted by the small circle symbol). One can even define mapping to lumas specified by another EOTF, e.g. from input PQ lumas, to output Rec. 709 SDR lumas, etc.

A possible graphics insertion pipeline is elucidated with aid of FIG. 2.

FIG. 2 shows a HDR image communication and handling pipeline, exemplifying similar video communication systems. This is a sports production (a horse race), for a classical broadcasting service. One or more cameras 201 capture the sports event, the images of which are mixed in production booth 202. In production booth 202 one can mix the feeds from various cameras and produce a total HDR video, graded (or shaded) according to preference. The manner of specification of the pixel lumas of the consecutive video images is beyond the scope of the elucidation of the present invention. The broadcaster will produce original mixed HDR images 205, which comprise native video content 206 (the feed from the camera(s), after suitable shading), and the broadcaster's own graphics (an example of primary graphics). This graphics can be many things in different applications, but in this example it is the list of the names of the two horses at the head of the race. We will call this original graphics which gets communicated pre-mixed inside the video image the primary graphics element 207. It will get distributed, e.g. by satellite dish 203 to an apparatus 210 of a local distributor. This can be e.g. a Dutch broadcaster, or redistributor, which will e.g. distribute to consumers over terrestrial broadcast or cable 219. Local distributor may mix its own, secondary graphics, e.g. the logo of the broadcaster ("NL6") in a sun. We will assume the pixel colors of the primary graphics to be e.g. all white, and of the secondary graphics to depend on white, e.g. a yellow sun of 90% luminance of white, with 60% brightness red text colors inside. This broadcaster may also mix other kinds of secondary graphics, e.g. a teaser 217 of a sports show to come. This further mixed video (215) (a.k.a. secondary mixed image(s)/video) is further distributed over a television communication cable (CATV) 219 to end customers. The end customer may have a settopbox (or computer, etc.) 220 which may mix tertiary graphics (etc.). In the example subtitle information is co-communicated in the video signal (typically as pure textual information which still needs to be rendered into video pixels, constituting a generated video element), which gets rendered as tertiary graphics 226 by the settopbox, and again mixed into the video images yielding tertiary video 225, before they are communicated over e.g. HDMI cable 229 to consumer display 230. In fact, instead of (or in addition to) the settopbox—which might not be present in some handling pipelines—the end display may also be inserting its own coordinated graphics.

In this text (when denoting certain graphics on a higher level of conception) we will call all additional graphics (in this example the secondary and tertiary graphics) "secondary graphics", to distinguish from primary graphics which is the previous graphics situation, often first graphics put into the video (typically by the original creator of the video). In general, the image(s) per se (i.e. the matrices of pixel colors, e.g. YCbCr), Im_HDR, is co-communicated with metadata (MET) in the HDR image or video signal S_im, which metadata can in various HDR video coding variants code several things, e.g. the coded maximum luminance of the HDR image, e.g. ML_C_HDR=1000 nit, and oftentimes luma mapping functions to calculate secondary image colors of a re-graded version of the image, etc.

It is desirable that the various graphics are not uncoordinated all over the luminance dynamic range, or even worse varying in luminance over time (e.g. compared to each other), but rather have e.g. the same average luminance, as is shown on the e.g. 950 nit ML_D luminance dynamic range of the end consumer display 230. In this manner one can improve the technical functioning of e.g. a television display (or other apparatus receiving a primary video-graphics mix), regarding the rendering of its secondary graphics. If one has a simple system which already calculates the display-adapted to be displayed video images with their optimal pixel lumas, and one simply wants to add primary graphics into that already established range, it may not be so difficult or critical to do this, but especially with different kinds of graphics being added by different apparatuses in different locations of the HDR video handling pipeline, things may be more complex.

US20180018932 teaches a number of mixing techniques for a primary graphics element (not mixing a secondary graphics if primary graphics has already been mixed) There is also no establishing of a suitable location of a graphics sub-range of the primary graphics in the master HDR video (the graphics maximum is just mapped to the video maximum, i.e. the entire range).

The most complex variant to understand, the video priority mode elucidated in US'932—FIG. 2A has been summarized in this application with aid of FIG. 8. If we want a stable graphics in the output of an end user display-adapted image to be displayed (e.g. an image composed for end user display maximum luminance ML_endUSR_disp being 750, to be displayed), that can be realized by giving all pixel luminances of say a monochromatic white text (TXT) the same value for a number of successive images (e.g. a few scenes, or if it is an user interface graphics, as long as that graphics is to be presented).

Let's say that a good final value for the text luminance is where the cloud object of the video gets projected in the display dynamic range. Graphics typically does not have the same dynamic range (in particular its graphics maximum luminance ML_gra) as the input video with which it is to be mixed (video maximum luminance ML vid), nor typically as the end-user display's maximum luminance, since various users may have bought different displays. In fact, associating graphics with some dynamic range at all is already a somewhat advanced HDR technique, since in LDR times graphics usually had some relative 3×8 bit code (e.g. 255/255/255). The problem is that with dynamic metadata, which communicates luminance mapping functions of different shape for successive shots of images to be applied by the end user display, one has no guarantee what premixed text would do. If one were to mix the original text (TXT_OR) into the video in its original luminance, e.g. 390 nit, then the display may move that luminance upwards with some mapping functions and downwards with other mapping functions, i.e. it may start flickering. But one can pre-compensate for this if one knows exactly which dynamic mapping function (e.g. first dynamic mapping function F_dyn1) the display would apply to the video, whether it had graphics mixed in or not. One could then pre-map (with first pre-compensation function F_precomp1) the graphics to exactly the luminance it would need to have in the HDR image to be sent from the e.g. set-top box to the display, so that it gets mapped by F_dyn1 to the desired end luminance in the image to be displayed (as bright as the cloud). Maybe in the next scene a piece of paper gets up-mapped to the same end luminance for TXT, by second dynamic mapping function F_dyn2, so then we use second pre-compensation function F_precomp2. Typically which function is applied by the display, depends on its maximum luminance ML_endUSR_disp, and a dynamic, time-varrying reference luminance mapping function, which specifies how the 4000 nit video luminances should be mapped to e.g. a 100 nit reference image. A pre-fixed algorithm then deforms this reference luminance mapping function to the final display-adapted luminance mapping function which will be used by the tv for any successive image until a new dynamically changed function comes in as metadata. But if the set-top box is codec-compliant, i.e. it knows the reference luminance mapping function, and knows the algorithm how it is transformed to the final display-adapted luminance mapping function for any value of ML_endUSR_disp, and polls the ML_endUSR_disp from the connected display, it can do any such pre-compensation.

The prior art shows a few other examples of mixing primary graphics, which are more straightforward.

Graphics priority mode, illustrated with US'932—FIG. 2B, simply maps the graphics maximum to the maximum of the display. It can then do the downmapping of the video to that range, already in the set-top box. If everything is prepared in the STB, and simply an optimal display-adapted image is communicated to the display over HDMI which need no further processing, then graphics mixing is relatively straightforward. The STB has everything in hand, and there is no variable mapping happening later. But those two options are not always available. E.g., the STB may not license the technology of some codec, because it is rather expensive, and STBs get sold with minimal margin. The display, e.g. consumer television, would then need to do the dynamic HDR luminance mapping anyway. Pre-compensation is also not always possible, e.g. if the tv refuses to communicate to the STB its ML_endUSR_disp value. Even if these methods may be useful for home appliances like STB and TV, or computer and monitor, there may be many more locations in a video communication pipeline from "camera" to final consumption display (e.g. in a shopping mall) where graphics need to be inserted.

If the tv can do the graphics blending (as illustrated in US'932—FIG. 2D), then things may also be relatively straightforward. The tv can apply its usual display-adapted luminance mapping function to the video, and thereafter put the graphics wherever it is desired, e.g. at the output luminance where the cloud ended up. This may be okay for passed-through DVB subtitles, which have a standardized coding, but then the STB needs a mechanism to communicate the graphics of its own UI graphics elements over the HDMI interface.

US2020193935 switches the mapping of displays to static when graphics are mixed, so the graphics will always end up at the same (shifted) luminance location, which also has its pros and cons.

It is clear that in the recent technical field of high dynamic range video/television there is still a need for good graphics handling techniques.

SUMMARY OF THE INVENTION

The problems existing in simple approaches to graphics mixing/insertion are handled by a method of determining in a circuit for processing digital images second lumas of pixels of a secondary graphics image element (216) to be mixed with at least one high dynamic range input image (206), the method comprising:
receiving a high dynamic range image signal (S_im) comprising the at least one high dynamic range input image, characterized in that the method comprises:
analyzing the high dynamic range image signal to determine a range of primary graphics lumas (R_gra) of a primary graphics element of the at least one high dynamic range input image, which is a sub-range of a range of luminances of the high dynamic range input image, wherein the determining a range of primary graphics lumas comprises determining a lower luma (Y_low) and an upper luma (Y_high) specifying endpoints of the range of primary graphics lumas (R_gra);
luminance mapping the secondary graphics element with at least a brightest subset of its pixel lumas comprised in the range of graphics lumas; and
mixing the secondary graphics image element with the high dynamic range input image.

The luminance mapping to the graphics sub-range in the input (video+primary graphics mix) HDR image, casu quo any output variant image derivable from it by mapping its lumas with some luma mapping function, can in principle happen whilst creating (i.e. defining) the pixels of the graphics. In general however, even if the graphics is not read from storage where it is contained predefined, and is generated by any method or apparatus embodiment, the graphics will be generated in some different format (e.g., without limitation, an LDR format, or a 1000 nit maximum luminance format), but the lumas (or any codes, e.g. linguistic codes like Chartreuse) of the pixels constituting the secondary graphics will then be mapped to suitable positions in the established graphics range (or maybe somewhat outside, typically on the below/darker end), where they become the respective corresponding secondary lumas of the various graphics pixels.

Mixing may oftentimes simply be the replacement of an original video pixel by a graphics pixel (but of coordinated color, in particular coordinated luma). The method also works with more advanced mixes, in particular if more of the graphics is retained, and less of the graphics is mixed in. E.g., a linear weighing called blending may be used, where a certain percentage of the determined graphics luma (Y_gra) is mixed with a complementary percentage of the video:

$$Y\_out=alpha*Y\_gra+(1-alpha)*Y\_HDR \quad [\text{Eq. 1}]$$

Alpha typically is higher than 0.5 (or 50%) so that essentially the pixel contains mostly graphics, and the graphics are well visible. In fact ideally/preferably such a mixing doesn't happen on the luma (in particular for highly non-linear luma definitions like PQ) but on the derived luminances themselves:

$$L\_out=alpha*L\_gra+(1-alpha)*L\_HDR \quad [\text{Eq. 2}]$$

In embodiments where a proxy SDR image is communicated for the HDR image, such a HDR video luminance L_HDR may be obtained by re-converting the SDR luma to a HDR reconstructed luminance by using e.g. the metadata-co-communicated maximum luminance ML_C of the HDR representation being communicated, and where necessary using a display adaptation to down-grade this luminance to a corresponding luminance in the display dynamic range. In fact, one sees from FIG. 3 that the elegance of at least such an approach to constructing luma mapping functions (or corresponding luminance mapping functions) is that one can map/mix graphics both in the input as well as the output range, since the curve maps the graphics range in a stable manner. More generally, the present approach can make use of the fact that the content creator—for his primary graphics—will have decided what an optimal position is for the graphics, or at least signed off for a reasonable position of the graphics. Therefore it will comprise suitable luminances also for the secondary graphics, if that is suitably coordinated with the primary graphics.

If one doesn't get any specific information about such primary graphics, e.g. because the video creator doesn't want to spend the effort to code and communicate it, the present method or apparatus can analyze the situation of the incoming HDR video signal S_im, and by various embodiments come to a determination of a suitable range R_gra for locating the lumas (or luminances) of at least the majority of the pixel colors in a secondary graphics element.

How to do this exactly, depends on the nature of the graphics element.

If we have a secondary graphic that has only one or a few (say original, before luminance mapping to implement coordination) colors (like a subtitle) one can just render the secondary graphic with any luma inside the graphics range. More complex images may limit the darkness of the blacks, e.g. no deeper than 10% of the white luminance, or put some of the darker colors outside/below of the range of primary graphics (but the effect of stable graphics presentation is largely maintained in view of the lumas of the brighter colors). E.g., a slightly changing black surround rectangle, on top of underlying HDR video, may be less annoying if the subtitle colors remain stable coordinated with the video object lumas of one or more successive scenes. One may sometimes want to avoid that relatively large clearly below average dark colors oscillate too much in brightness, but this can be handled separately if an issue, e.g. by brightening those darker colors to come close to the lower point of the suitable graphics range (i.e. a little below or above its minimum luminance). One wants to keep the brightest colors of the secondary graphics in the graphics range R_gra, e.g. that brighter sub-range being defined as (e.g. by the television receiver constructing engineer) all colors brighter than 50% of the luminance of the secondary graphics element (which percentage may depend on which kind of graphics one wants to add, e.g. menu items may need less precision than e.g. some logos). Oftentimes the brighter sub-range will contain enough colors to represent (geometrically) a majority of the secondary graphics element, so that e.g. its shape can be recognized.

The full luma distribution of the primary graphics need not be perfectly known, as long as one has a reasonable idea of the typical lumas, at least of the brightest colors in the primary graphics. To analyze the situation of the HDR video signal and its images and the luminances or lumas of its object pixels, several approaches may be used, by themselves or in combination, in which latter case some algorithm or circuitry will determine the final best determination of the graphics range based on the input of the one or more circuits applying analysis techniques (in case there is only one circuit/approach present in any apparatus or method, such a final consolidation step or circuit is not needed).

It is advantageous if the method of analyzing the high dynamic range image signal comprises detecting one or more primary graphics elements in the high dynamic range input image, establishing the lumas of pixels of the one or more primary graphics elements, and summarizing the lumas as the lower luma (Y_low) and the upper luma (Y_high), wherein the lower luma is lower than all or a majority of the lumas of pixels of the one or more primary graphics element and the higher luma is higher than all or a majority of the lumas of pixels of the one or more primary graphics elements.

Analyzing the images themselves may be a robust option if no further information is available or can be relied on. E.g. this algorithm (or circuitry) may detect that there are two primary graphics elements present in the "original" version of the video content. Let's say there are some subtitles present in three colors for three speakers (white, light yellow, and light blue), and some logo with multiple colors, e.g. a few primary colors and 5% luminance black compared to the white of the subtitles, or of the logo itself. Oftentimes it may be expected that the white (or at least where the white luminance may be expected extrapolating from e.g. the yellow pixels of the logo) of the logo and the subtitles will be the same or approximately the same. Especially if they don't differ too much (e.g. the subtitles are 5× brighter than the white of the logo, or vice versa), the present method can still relatively easily define a graphics range R_gr, by then treating the darker whites as if they are "some grey" referred to the brighter white. I.e. the upper part of the primary graphics range R_gra may then be the white of the brightest pre-mixed graphics, and all graphics may still be identified as one range, rather than the application with two times an identified differential range (in which case e.g. the secondary graphics could be mixed in either range, or a preferred one). If both graphics elements differ a lot in brightness (white luminance) then the brighter primary graphics element may be retained in the graphics analysis, and the darker one discarded, to base the R_gra on the brightest primary element. This embodiment may be useful if the luma mapping functions do not have a safe graphics range as elucidated with FIGS. 3 and 4, but are e.g. simple power functions, which not having a special region, merely function as a continuously compressing function.

It is advantageous if the method comprises reading from metadata in the high dynamic range image signal a value of the lower luma (Y_low) and (/or) the upper luma (Y_high) which was written into metadata of the high dynamic range image signal. A creator of the at least one high dynamic range input image can use this mechanism to communicate what he (or it in case of an automaton) thought was a suitable graphics range for this image or this shot of video images (e.g. coordinating with the bright pixels of a nearby explosion, which should not look diminished to the human visual system in view of its recognition of e.g. a nearby white of subtitles). He will put his primary graphics at such luminances. Note that the human visual system can make all kinds of estimates regarding what is in the image (e.g. local illumination) and this can be quite complicated, but the present technical mechanisms provide an easy solution by those who should know (e.g. the human creator or color grader and/or post-producer of the video) E.g., the range as communicated may be slightly darker than the luminances actually used in the primary graphics, guaranteeing some coordination and a higher brightness of the primary graphics. Any consolidation step or circuitry may then simply discard or switch off other functionalities, like the analysis of the HDR images themselves. Or it could use any mechanism available.

It is advantageous if the method comprises analyzing the high dynamic range image signal comprises reading two or more luma mapping functions associated with temporally successive images from metadata in the high dynamic range image signal and establishing the range of graphics lumas as a range which fulfills a first condition regarding the two or more mapping functions, wherein the two or more luma mapping functions map input lumas in this range of graphics to corresponding output lumas and the first condition being that for each input luma its corresponding two or more output lumas as obtainable by applying respective mapping functions from the two or more luma mapping functions to said input luma, are substantially the same. FIG. 7 shows an example where two functions have a sub-range of its input range where the functions are (substantially) the same, i.e. they create (approximately) the same output value for any input value in that range. This can be detected, as the content creator having had the intention of making graphics-robust dynamic luminance mapping functions.

So not only that range is similarly mapped to a stable output range, but the various lumas in it are mapped to substantially the same output lumas by both functions (except for possibly some minor deviation, typically not too visible, e.g. within the 2% typical human vision noticeable difference, or 10% if some more flicker is still acceptable). One may want to supplement such analysis with further analysis.

Specifically this may also involve verification of a second condition of the function-based determined primary graphics lumas falling within a secondary range of lumas which would be suitable for graphics. Just finding a region where the various functions, for at least a succession of shots (e.g. an indoors shot, thereafter an outdoors shot) doesn't necessarily mean that one would want to put graphics there. E.g., if only the darkest 10% of the total range of (input or output) is identified, that would lead to dark graphics, which is in general unpreferable. E.g. ½ to $\frac{1}{10}^{th}$ of a high brightness dynamic range (e.g. maximum luminance 4000 nit or higher) may be a suitable position to place subtitles or other graphics. The ½ for 4000 nit or more may be suboptimal though. Since that will yield quite bright graphic maximum brightnesses, and for graphics like text, where the brightest color is typically a normal (diffusive) white, in contrast to more versatile graphics in which there may be a number of different whites comprising super-whites, the 2000 nit level may be considered high. However, the creator of the mapping functions may have considered it optimal to put the stable graphics range at say 0.8*0.5-1.2*0.5, for a 5000 nit master grading. If this curve is used to down-grade to outputs up to output maximum of say 1000 nit, then 500 nit graphics, even subtitles, may be considered reasonable, i.e. meet the suitability criterion. If the second criterion is not met, the graphics mixing apparatus may e.g. try to stay close to the identified range, but decide to mix the graphics with lumas below the lowest value of that identified function-shape-dependent (i.e. where the two or more functions have a sub-range that projects the same input sub-range to the same output sub-range) graphics range. Various secondary criteria may be used, e.g. a criterion of how high a percentage of the output range maximum the upper point of the functions-shape-identified stable graphics range is (i.e. also depending on the absolute maximum, i.e. the allowed percentage may be lower the higher the maximum of the output range is, e.g. 500 nit upper point for 1000 nit range, and 1200 nit upper luma for 4000 nit output range maximum or higher) and/or how high an absolute luminance value this output range upper limit would display at. So typically regarding the relevance of identification of the function-determined range one would look at the values along the range of input lumas (i.e. of the received image), but regarding suitability the output range and the maximum luminance of the output range envisaged (i.e. what e.g. a transcoding also mixing in graphics is going to produce) may also come into play, to determine suitable what from the input luma values alone may be a stretch. E.g. brighter than 2000 nit original graphics present as pre-mixed graphics in the input image, to become typically lower than 1000 nit max. output, which would e.g. with a leveling-off soft-clipping mapping function starting from a 4000 nit maximum input e.g. end up at 900 nit in the output (which are rather bright subtitles compared to the HDR effect of the brightest video objects, which should be more impressive than the graphics white level ideally, but at least it may be a level not to be discounted per se, as 900 nit graphics may still be acceptable to some users in some scenarios). A good secondary criterion would be the maximum of the secondary range must be lower than a pre-fixed percentage of a maximum of a range of mixing image and graphics.

Any apparatus can be programmed with limits of expectable graphics. E.g., one may expect them to be at or somewhat above the expected sub-range of normal ("LDR") image objects in the HDR images. For a 1000 nit ML_C defined HDR image, one may expect the white of graphics to fall somewhere in a range between typically 80 nit and 350 nit, and the blacks below that, depending also on whether there are several primary graphics elements and whether they have identical luminance (or luma) characteristics.

So embodiments of the verification could go as follows. If the analysis of the luma mapping curves found an upper luma for the graphics of say 150 nit, this would indeed fall within a range of expectable luma values for bright graphics pixels, as it falls in the larger range of [80. 350]. Similar considerations could be done for lower level, but as we stated the lower level is less critical, and may e.g. simply be set at 10% of the determined upper luminance (or the corresponding x % of the upper luma, when looking it up on the applicable EOTF of the pixel color coding). If the method e.g. estimates an upper luma's luminance of e.g. 950 nit, this may be an accident of the analysis, since ideally one does not want such excessively bright graphics. But it may be indeed that some content provider has somehow created such bright sub-titles. In such a situation, instead of merely rejecting the value, and concluding that no graphics range could be determined with sufficient certainty, further analysis may be done, e.g. checking which graphics luma the creator has actually co-communicated in the video signal, or look for such luma values in the video signal, and try to do further image analysis, e.g. how connected and large those pixel sets are, etc.

Note that not always the HDR images need to actually have primary graphics present at their respective suitable luma positions (e.g. a first shot of images having a first luma mapping curve coordinated for mapping essentially bright HDR scenes may actually contain a graphics element, but a second following shot having a different luma mapping curves for mapping normal and bright image objects may not have actual graphics inserted, but if it did would put those at roughly the same luma values).

It is advantageous if the method comprises a step of luma mapping the pixel lumas of the at least one high dynamic range input image to corresponding output lumas of at least one corresponding output image, wherein the mixing happens in the at least one corresponding output image in accordance with at least one luma mapping function obtained from metadata of the high dynamic range image signal.

The relationship, especially when having functions like in FIG. 3, may lead to the ability of being able to mix in both the input and output luma domain. It may not always be the same whether to mix in the input our output domain (and in some embodiments catering for some HDR codecs it may be useful to know where to mix in the input luma domain). In any case, the video pixels are often mapped to the output domain by a metadata-received luma mapping function. The method or apparatus may use this mapping function to determine suitable luma positions in the output domain (e.g. 350 nit maximum ML_C) for mixing output-determined graphics. This creates flexibility regarding which apparatus can mix what, when. Especially with the stable sub-region functions, one can easier understand what would happen to already performed graphics mixes, even if those functions get distorted in display adaptation scenarios (i.e. by making the shape of the original function more similar to the shape of a secondary function, then that stable sub-range will stretch or compress but keep its identical coordinated mapping property for the lumas inside the range if the adaptation is performed correctly, with both primary and reference function respecting that sub-range).

It is advantageous if the method comprises designing the secondary graphics image element with a set of colors spanning a scale of colors of different lightness, some of which to the human eye appear above-average light and some of which appear below-average dark, wherein at least the above-average light colors are mixed into the at least one high dynamic range input image with lumas in the range of graphics lumas.

A scale of colors is a set of colors of increasing (or decreasing) lightness, e.g. from some color which looks blackish, to some light color, and often some intermediate lightness colors. This scale need not necessarily contains all steps of a certain primary, e.g. blue, but limited color palettes may e.g. have a few light blue steps, and a few dark greens, but no dark blues (the greens then define the darker steps of the scale). If the eye checks an approximate average lightness of the graphics element, some colors will appear typically dark, and some will appear light. A lightness measure of around 50%, or a luminance of around 25%, may be atypical value seen as midpoint, or usable as midpoint. So pixels with luminances of below e.g. 25% may be seen as darker colors, not needing to satisfy the within graphics range criterion anymore. If tighter systems demand more colors to be in the graphics range, the secondary graphics may be designed with less-dark colors.

Some embodiments of the secondary graphics insertion of the method may mix by either using the more predictable mixing method of pixel replacement (i.e. drawing a graphics pixel of suitable established luma where there used to be a video pixel of the original video), or blending with a percentage of less than 50% of the luminance of the at least one high dynamic range input image, which percentage is preferably 30% or less, so that the video shines through somewhat and can still be seen, yet the luminances of the graphics are predominant, and largely retained from their luma determination.

It is advantageous if the method designs the set of colors of the secondary graphics element(s) comprises selecting a limited set of relative bright below-average dark colors, which have lumas above a secondary lower luma, which is a percentage of the lower luma, which is preferably higher than 70% of the lower luma. If a graphics range R_gra is determined, suitable secondary graphics colors can be determined. E.g., the method can decide not to go too much below the determined safe lower limit, e.g. only 30 less deep, to lessen impact of potentially wildly changing luma mapping. This percentage may depend on such aspects like how many dark pixel there are in the secondary graphics, or at which positions, etc. E.g., if there are only 5 dark pixels in a 100×100 pixel graphics, the average perceived lightness of the secondary graphics will not be influenced too much by these few dark pixels no matter how they are ultimately displayed in the output image.

The methods may also be realized as apparatuses, e.g. an apparatus (500) for determining second lumas of pixels of a secondary graphics image element (216) and mixing the secondary graphics image element with at least one high dynamic range input image (206) which comprises a primary graphics element (207), the apparatus comprising:

an input (501) for receiving a high dynamic range image signal (S_im) comprising the at least one high dynamic range input image;

an image signal analysis circuit (510) arranged to analyze the high dynamic range image signal to determine a range of graphics lumas (R_gra) of the at least one high dynamic range input image which is a range specifying lumas of pixels representing primary graphics, which is a sub-range of a range of luminances of the high dynamic range input image, wherein the determining a range of graphics lumas comprises determining a lower luma (Y_low) and an upper luma (Y_high) specifying endpoints of the range of primary graphics lumas (R_gra);

a graphic generating circuit (520) arranged to generate or read the secondary graphics element, and luminance map it with at least a brightest subset of its pixel lumas comprised in the range of graphics lumas;

an image mixer (530) arranged to mix the secondary graphics image element with the high dynamic range input image, yielding pixels with mixed luminances (Lmax_fi); and an output (599) for outputting at least one mixed image (Im_out) which comprises the pixels with mixed luminances (Lmax_fi).

Or an apparatus in which the image signal analysis circuit (510) comprises an image graphics analysis circuit (511) arranged to:

detect one or more primary graphics element in the high dynamic range input image, establish the lumas of pixels of the one or more primary graphics element, and summarize the lumas as the lower luma (Y_low) and the upper luma (Y_high) wherein the lower luma is lower than all or a majority of the lumas of pixels of the one or more primary graphics element and the higher luma is higher than all or a majority of the lumas of pixels of the one or more primary graphics element.

Or an apparatus in which the image signal analysis circuit (510) comprises a metadata extraction circuit (513) arranged to read from metadata in the high dynamic range image signal a value of the lower luma (Y_low) and the upper luma (Y_high) which was written into the high dynamic range image signal e.g. by a creator of the at least one high dynamic range input image.

Or an apparatus in which the image signal analysis circuit (510) comprises a luma mapping function analysis unit (512) arranged to read two or more luma mapping functions (LMF(t), LMF_p) of temporally successive images from metadata in the high dynamic range image signal (S_im) and to establish the range of graphics lumas as a range (R_id) which fulfills a first condition regarding the two or more luma mapping functions, wherein the two or more luma mapping functions map input lumas in this range of graphics to corresponding output lumas and the first condition being that for each input luma its corresponding two or more output lumas as obtainable by applying respective mapping functions from the two or more luma mapping functions to said input luma, are substantially the same.

Or an apparatus in which the image mixer (530) comprises a luma mapper (533) arranged to map lumas of pixels of the at least one high dynamic range input image to corresponding output lumas of at least one corresponding output image which has a dynamic range, e.g. a maximum luminance, which is different from a dynamic range of the at least one high dynamic range input image, and arranged to perform the mixing in the at least one corresponding output image, in accordance with at least one luma mapping function obtained from metadata of the high dynamic range image signal.

Or an apparatus in which the graphic generating circuit (520) is arranged to design the secondary graphics image element with a set of colors spanning a scale of colors of different lightness, some of which to the human eye appear above-average light and some of which appear below-average dark, wherein at least the above-average light colors are mixed into the at least one high dynamic range input image with lumas in the range of graphics lumas.

Or an apparatus in which the image mixer (530) is arranged to mix by means of either pixel replacement of a video pixel of the at least one high dynamic range input image by a secondary graphics element pixel, or blending with a percentage of less than 50% of the luminance of the at least one high dynamic range input image, which percentage is preferably 30% or less.

In particular, the skilled person understands that these technical elements can be embodied in various processing elements like ASICs (application-specific integrated circuits, i.e. typically the IC designer will make (part of) an IC perform the method), FPGA's, processors being programmed, etc., and can reside in various consumer or non-consumer apparatuses, whether comprising a display (e.g. a mobile phone encoding a consumer video) or non-display apparatuses which can be externally connected to a display, and that the images and metadata can be communicated over various image communication technologies such as wireless broadcasting, cable-based communication, and that the apparatuses can be used in various image communication and/or usage ecosystems such as e.g. television broadcasting, on-demand over the internet, video monitoring systems, video-based communication systems, etc. Innovative coding HDR signals may correspond to the various methods, e.g. communicating at least one lower and upper luma value of at least one primary (pre-mixed) graphics range.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings.

DETAILED DESCRIPTION OF THE EMBODIMENTS

Figure 3:
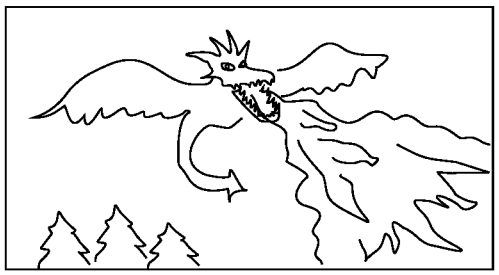
FIG. 3 schematically shows one possibility of defining image-content-adaptive luma mapping functions which provide for more stable, determinable graphics insertion.
Figure 3:
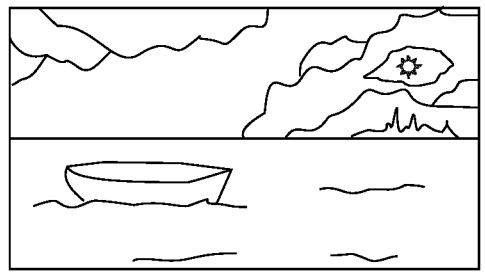
Figure 3:
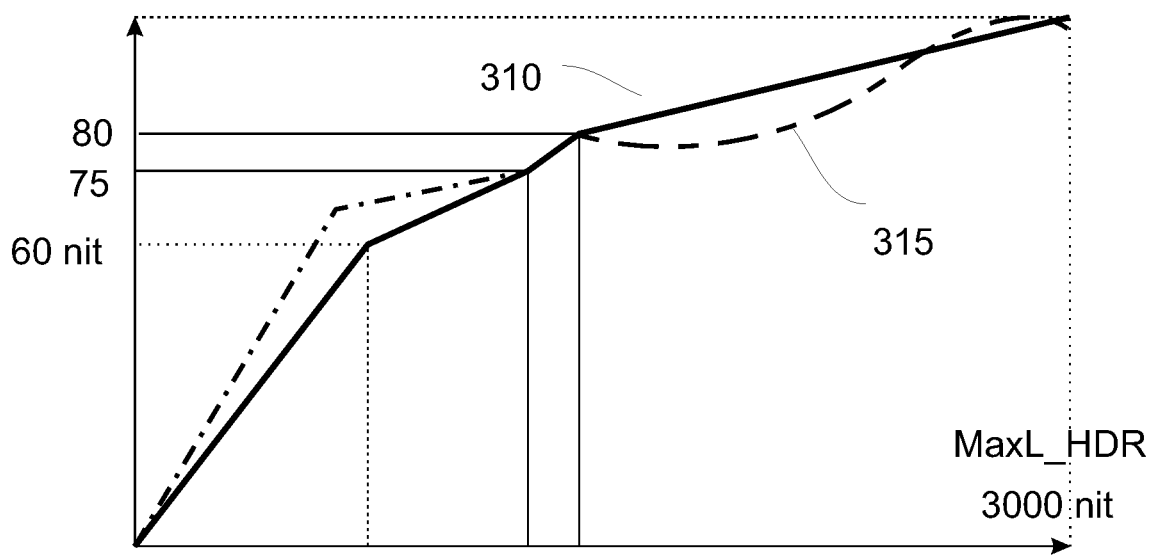
Figure 3:
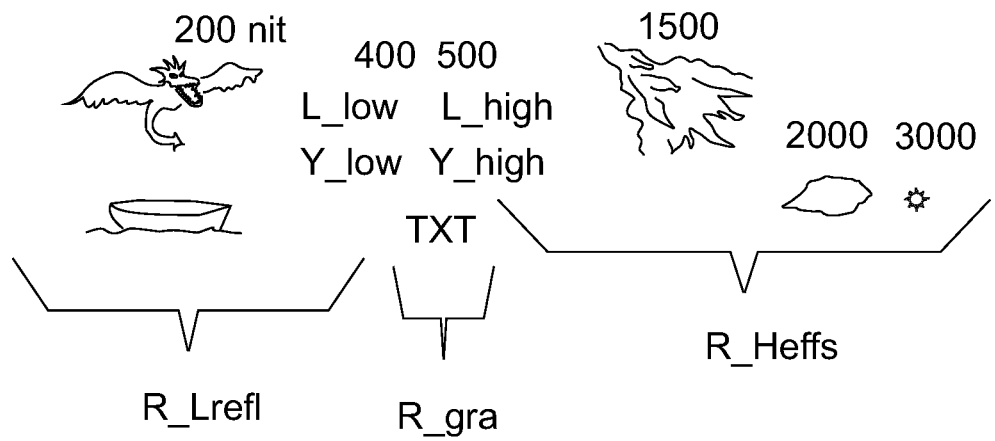

FIG. 3 shows in more detail how HDR video images with graphics can best be constructed. It shows two typical HDR scene images (which may e.g. be of temporally neighboring shots of images), for which one may want to specifically grade pixel luminances to get impressive HDR effects. In particular, HDR images allow to make pixel colors which are both bright and of saturated colors, whereas in LDR bright colors would need to be desaturated and far less beautiful. Furthermore, the color grader will typically look at the psychovisual impact of the various image objects, so that e.g. the dragon's fire looks bright, but not too bright.

Without wanting to be limiting, we have two scenes which the creation side can typically handle as follows. Although both scenes (having as sole similarity that they contain an important region of high brightness) have quite different content, and would be luminance-specified i.e. graded differently, they both contain a few normally reflecting objects (i.e. objects which reflect a certain percentage of the locally illuminating light). Those would reflect an average amount of light present in the scene, and thus get relatively low luminance, on par with the luminances they would get in LDR. The idea is that—after human visual adaptation, or when making a to be displayed image assuming such adaptation—those would yield the darker colors below the high brightness range of luminous colors such as light bulbs, clouds strongly reflecting sunlight, etc. For the fire breathing dragon image 301 that would be the body of the dragon. For the sunset at sea image 302, that would be the boat. Those normal objects would fall in a darker sub-range R_Lrefl covering the lowest luminances available on the input dynamic range (which total range goes from 0 to MaxL_HDR=3000 nit in the example), which goes up to e.g. 200 nit, for these scenes. If the dragon has a red body, it may e.g. on average have 130 nit pixels, but if it has a black body, it may have e.g. 20 nit pixels. Graphics pixels, e.g. for subtitles, may typically be placed conveniently somewhat above this darker sub-range. This has the advantage that they are nicely bright and conspicuous (like the white of LDR), but on the other hand they don't overpower the HDR effects of the video itself. One could argue that—especially if the two images are from mixed separate HDR sources—the upper luminance (or its luma coding that luminance, e.g. in Perceptual Quantizer luma definition) need not be the same for both ranges of normal scene colors. But one could constrain it to be in its vicinity by coordination prior to the mix of video images (e.g. the dragon range to be maximally 1.5× brighter at the upper end of the range than the boat and sea range), and take this into account by setting the graphics range e.g. starting at the upper end of the brighter of the two (e.g. starting at 300 nit instead of 200, or 220 instead of 150, approximately). The HDR effects are e.g. the orangeish-yellowish fire of the dragon, which may be rendered at pixel luminance of around 1500 nit (this being a relatively large part of the image, brighter luminances would seem convenient). For the sunlit clouds of the sunset, those may reach e.g. 2000 nit, and the sun disk itself approximately 3000 nit (e.g. 95% of 3000 nit to make it yellow). All those HDR effects are clearly well above the graphics range, which can on the master HDR range of ML_C=3000 nit be specified by the video creator to lie between e.g. 400 nit and 500 nit (or 50-500 nit, when taking into account the lesser visual impact of darker graphics colors). For graphics using only a limited subset of brighter colors, one could focus on such a limited range, not covering too many of the normal and effect video colors, which may fluctuate in their grading, and especially re-grading by luminance mapping, When needing darker colors, one can balance how much below the 400 level one may want to go, e.g. based on expected or communicated variation of the lower part of the mapping function (e.g. in offline scenarios one may before processing look at all the curves that will occur during the movie, and determine some characteristic value of fluctuation of the upper part of the lower curve—shown in the example as the second linear segment- and in on-the-fly displaying of communicated video such a characteristic may be communicated, and taken into account when deciding where to map the deepest blacks of the graphics). E.g. an additional luma or luminance value (below L_low resp. Y_low) may be communicated where the curve starts fluctuating more than e.g. 20% or 40% compared to the average curve starting downwards from the lower graphics range point, which is a fixed point. More critical applications (or types of graphics, like e.g. a black text box around monochromatic subtitles) may then choose the luminance or luma of this 20% or less fluctuation point for their darkest colors, and less critical applications can use the 40% point. Often the upper point may be more critical than the lower point (e.g. if bright pixels will be compressed strongly when re-grading happens). The lower luminance L_low of 400 nit gets represented as some lower luma code Y_low (e.g. 0.65 in PQ multiplied by the factor depending on the bit depth, e.g. 1023). We will assume without limitation in this text that all pixel luminances are always coded in the popular Perceptual Quantizer coding, although other EOTFs or OETFs may be used like Hybrid Loggamma (HLG), and our techniques can even work with mixes of EOTF/luma code definition (e.g. finding a first primary graphics element in a PQ luma defined pixel color coding and a second primary graphics element as secondary reference in some part of some image which is HLG encoded). Upper primary graphics range luminance L_high and upper primary graphics range luma Y_high would typically be determined e.g. where one does not expect too many critical HDR bright objects to occur, hence no specific e.g. strongly boosting or compressing local curve shape. One may define it as a percentage multiplier of the lower point (e.g. 150%), as curve continuity starting from a fix point will not yield too many visual mapping inconsistency problems if the graphics stay within that range. The amount for the graphics will typically depend on the maximum luminance of the input video, since we expect a need to be able to in a versatile manner compress various HDR objects of the upper range. E.g. if the input image would go only as high as 1000 nit, one may often not want to elect a 1.5×400 nit upper point, as it either leaves little room for the bright HDR objects (one may need to grade them far from the normal objects, which may not always be desirable), or their will be considerable overlap between the HDR video object luminances and at least the higher luminances possible in the secondary graphics range if one collocates it with that established primary graphics range.

Figure 1:
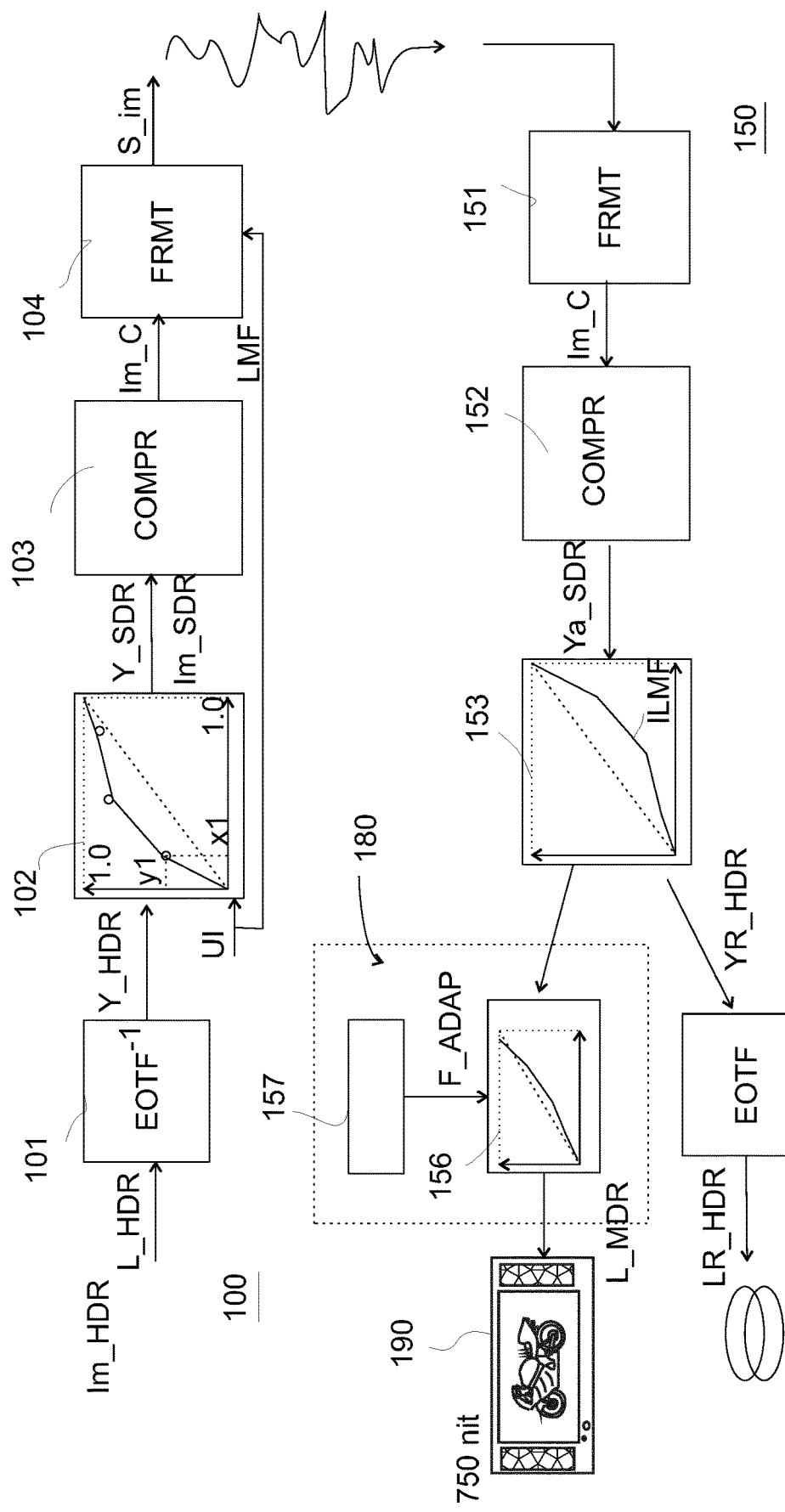
FIG. 1 schematically illustrates one of the possible HDR handling chains (comprising encoding, decoding, and potentially displaying), for which the present innovation can provide benefits.
Figure 2:
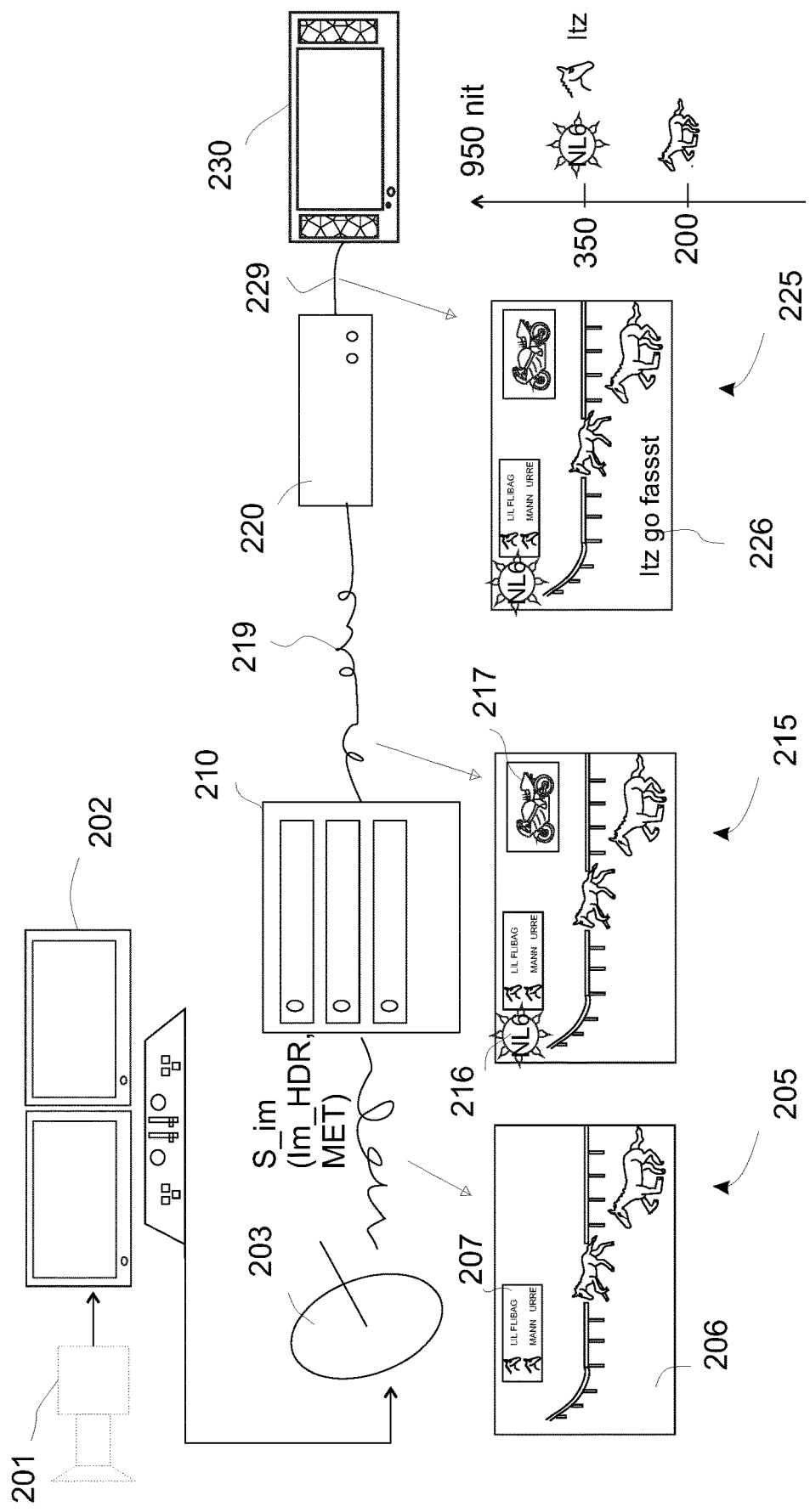
FIG. 2 schematically illustrates one typical situation in which primary graphics may occur, yet with a need to at one or more places insert secondary graphics.

When just having HDR images per se (i.e. just as final images, to be displayed equi-luminance, i.e. with each coded image pixel luminance being displayed exactly as coded), the graphics issue is not yet so complicated, but typically (as explained with FIG. 1) the HDR input images may need to get luma mapped (or equivalently luminance mapped). We show a first luminance mapping function 310 (the corresponding luma mapping function can be obtained by converting both input and output luminance ranges to ranges of PQ luma, or the input as a PQ luma axis, and the output as Rec. 709 classical LDR lumas, etc.) for the dragon image, to obtain a corresponding LDR graded image as output. We see that this function conceptually consists of three parts: a suitably shaped mapping for the darker, normal objects falling in input range R_Lrefl, a mapping for the range of HDR effects R_Heffs, and a mapping for the middle part, namely the graphics sub-range R_gra. The next scene in the video may be the sunset scene with a number of (i.e. shot of) consecutive sunset images. This may have another preferred re-grading luma mapping function (315), which as explained with FIG. 1 is typically co-communicated as metadata of the video signal to guide the display optimization of the end-apparatus, e.g. the consumer television display. But the video creator may define his re-grading function so that the graphics part remains stable, i.e. all of those luminances get mapped to corresponding output luminances which are the same for both HDR scenes. Then the graphics will look the same on both scenes, both in HDR and LDR (or any other intermediate display adapted image, e.g. the 950 nit ML_C image optimized for a 950 nit ML_D display). Also, the video creator (i.e. the creator of the luminance mapping functions) can elect which graphics sub-range would be reasonable both in HDR (3000 nit master HDR in this example) and LDR. Note that if HDR videos of different maximum luminance needs to mixed and graphics coordinated, this can be done via the output stable graphics range of the mapping, in this example the 75-80 nit LDR range. Note that one can liberally configure the graphics, so they can depend on what is in the effect range of the HDR movie.

Figure 4:
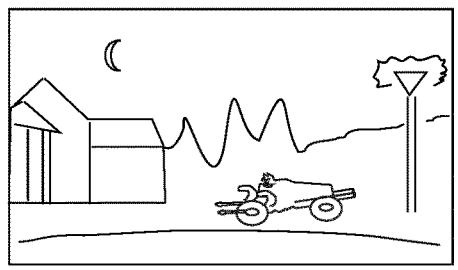
FIG. 4 schematically shows another example of, for different luminance content scenes, a possibility of defining image-content-adaptive luma mapping functions which provide for more stable, determinable graphics insertion.
Figure 4:
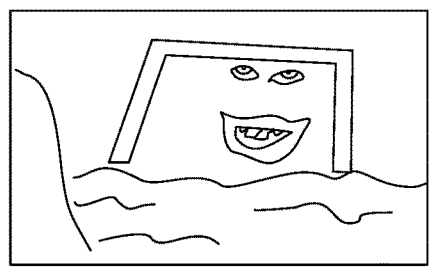
Figure 4:
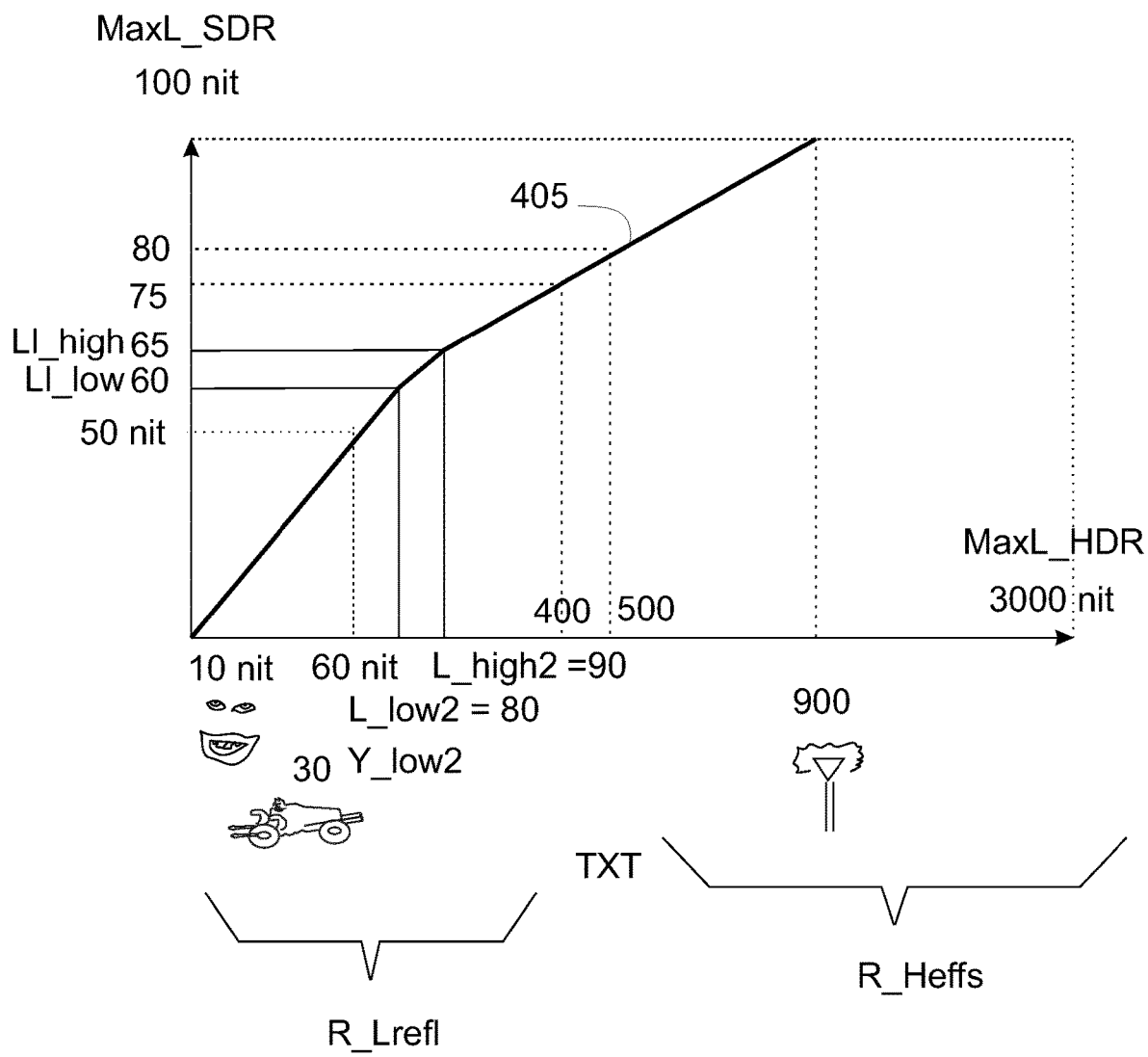

Now, as elucidated with FIG. 4, the rest of the movie contains two essentially dark scenes. The first one is a night scene 401, showing a motorcycle riding through a city. The motorcycle may be rendered at e.g. 30 nit, to give it a relatively dark impression yet still well-visible (in LDR one had to use the trick of making the pixels blue to simulate the night, in HDR one can play more on the darkness of the pixels themselves, yet one may still stay on the brighter side of the subrange of darkest pixels, e.g. expecting that HDR movies get watched under relatively bright illumination oftentimes). The only bright object in this image is the street light, which one may give a pixel luminance of 900 nit, to make it not annoyingly bright and distracting compared to the rest of the image. Thereafter comes another dark scene 402. It is not exactly a night scene, but in general still typically dark (a rainy day, so outdoors pixels will display dimly). The really dark part is a clown hiding in the sewer, which will get e.g. luminances of at or below 10 nit, to make him almost invisible. For those two image sets the video creator may have considered that a lower typical level for the primary graphics is more suitable, e.g. the other exemplary lower luminance L_low2=80 nit in HDR (represented by Y_low2 as a luma code in the HDR image), and the other upper luminance L_high2 equals 90 nit (in the HDR grading). We also show the corresponding suitable LDR lower luminance (Ll_low=60) and LDR upper luminance Ll_high=65 nit, which will depend on, or vice versa, determine the graphics part of the two luminance mapping functions for these two dark scenes (e.g. third luminance mapping function 405 for the motorcycle night images 401). The darkest segment of the luminance mapping function 405, which is for simplicity shown as a line segment, can be tailored at will so that the clown looks suitably dark also in the LDR re-graded image, which may be used for e.g. driving a legacy LDR tv. The fact that the graphics luminances suddenly change with this scene change (e.g. daytime bright fire breathing dragon to nighttime cityscape) is not a problem, as it was so desired by the video creator, as long as the changes are not "arbitrary". The current mechanism allows the video creator to elect all luminances of the various image objects as desired, instead of e.g. arbitrarily changing when using a simpler curve like a power function luminance mapping function with a variable power coefficient. Note that not all colors used in graphics need to be in the sub-range that stays equi-mapped between various different luma mapping curves. In general it suffices if the brighter colors of the graphics stay stable, and the darker colors can vary somewhat, for at least some applications or systems. The device mixing the secondary graphics can decide to use graphics lumas in a smaller range than of the primary graphics, e.g. only such lumas which indeed don't get differentially mapped in a number of successive differently re-graded scenes.

Figure 5:
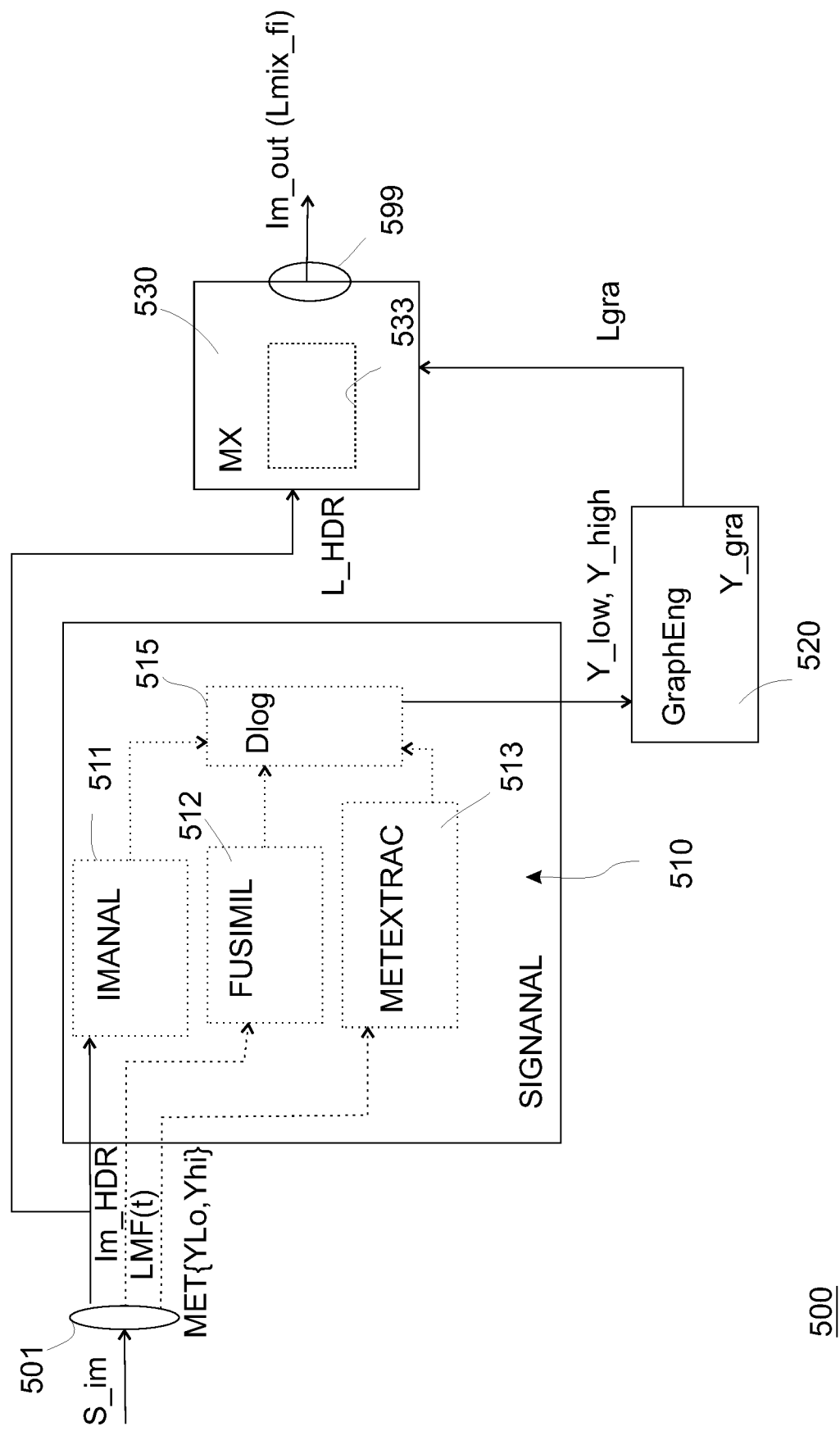
FIG. 5 schematically shows typical components of an apparatus illustrating some of the present invented principles.

FIG. 5 elucidates (on high level) a potential apparatus embodying concepts of the present invention.

In this exemplary embodiment it is (non-limitative) assumed that HDR image signal input 501 receives not only a HDR image per se (i.e. coded matrix of pixel colors, with information to decode being either co-communicated or known to the receiver, e.g. an elected EOTF), but also at least one luminance mapping function LMF for a time moment t corresponding to one of the images of a video, which may have variable shape for successive images, or shots of similar images of a same scene, e.g. a cave scene. There may (or not) also be explicit metadata regarding a lower and upper luma of primary graphics (MET(YLo, Yhi); not that we use L for luminances and Y for lumas). Let's assume those are defined in the input domain, i.e. for the received HDR image. There may be an image graphics analysis circuit (511) present in the apparatus. How that unit works may depend on the apparatus, e.g. some simpler apparatuses may only detect text, and a graphics range from that detected text, e.g. the range comprising all lumas used in all of the found texts, from the darkest text pixel to the brightest, or some fraction thereof it the range is rather large, e.g. the text pixels that are brighter than the average text luma, etc.

Figure 6:
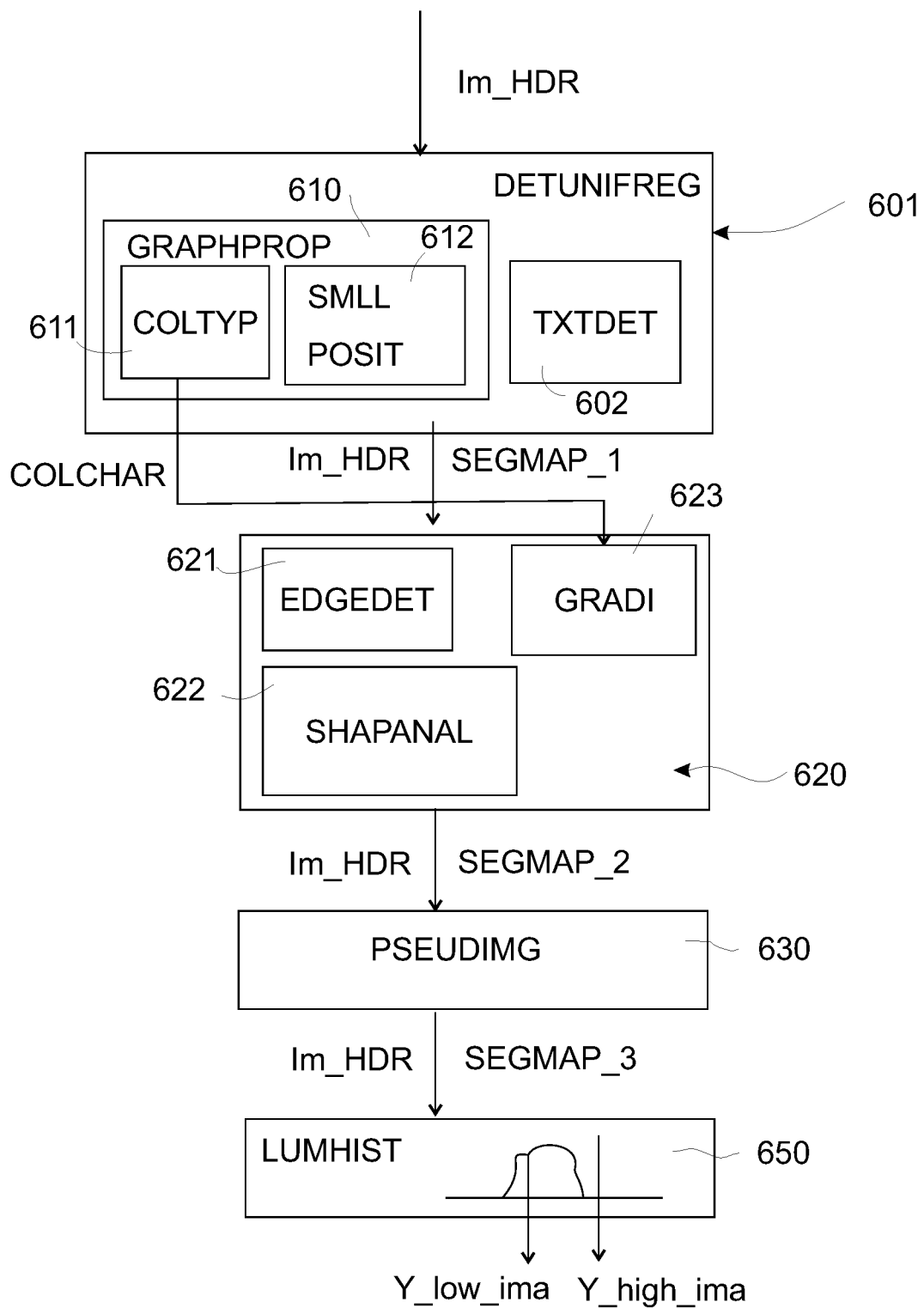
FIG. 6 schematically shows one possible embodiment of defining at least an upper and typically also a lower luma of an identified primary graphics range from analysis of primary graphics in at least one received high dynamic range image.

FIG. 6 explains one possible advantageous circuit for doing the analysis of primary graphics in the image (there may be other analysis algorithms used). The skilled person understands that with the various configurations of units as taught for elucidating the present innovation, other equivalent graphics analysis techniques may be present, as alternatives or supplementary.

A detector of regions of limited variation of colors (601) is arranged to check typical graphics colors, in typical graphics low level elements. Some graphics may be complex, but many of them will have a limited subset, possibly differently illuminated but e.g. having only two distinct chromaticities. E.g., since of there may be text present in the HDR image (e.g. the names of the horses may have the same white or single pixel colors as their colored head shapes), a text detector 602 may typically be present to already do a good determination or first determination of primary graphics colors. Segmentation maps, like first segmentation map (SEG_MAP1) are a simple manner for summarizing regions which have been identified as probable representative primary graphics pixels, so that later the colors of those regions/maps can easily be determined. So when there is e.g. a text character "G" identified, the underlying pixels will e.g. get value "1", in a matrix of initial zeroes. A property-based graphics analyzer 610 may also be present, and can be used for more complex graphics, e.g. in an iterative manner (graphics color property/properties identified, set determined, property re-identified). This will use e.g. a color type characterizer 611. E.g. highly saturated colors like a strange purple, may often (unless for flowers or the like) suggest that the pixels are probably graphics (graphics often contain at least some primary colors, which have some of the RGB components high or even maximum, and one or two components zero or near zero, and natural image content ideally does not contain such colors often, but rather subdued colors). These candidates can be verified further by other units, such as elementary graphics geometry analyzer 612. E.g. graphics of a shape which can be characterized, may be matched with that shape characterizer.

If a set of connected or vicinity (e.g. repetitive) pixels with specific color properties is small, it may be a graphics element, as one usually wants to make them non-intrusive, just sufficient for reading or seeing, especially if there are several graphics. And main movie objects are often zoomed in and large (e.g. a purple coat or magic fireball may comprise more pixels). Location may also be a heuristic: the graphics are usually near a border of the image, e.g. a logo at the top, or ticker tape at the bottom. Such pixels may form further initial candidates in the first segmentation map SEGMAP_1, to be verified or vice versa taken out again by further analysis. The skilled reader can understand how one could also use e.g. neural networks that may have been trained on e.g. simplicity or frequency-of-change aspects of graphics versus natural video, such as e.g. texture measures. A higher level shape analysis circuit 620 may analyze further properties of initially assumed graphics regions (i.e. e.g. starting based on the segmentation maps initially identifying potential graphics pixels), to get more stable sets of pixels for summarizing their lumas. As said, it is not needed that all primary graphics pixels are identified accurately up to the hilt. E.g. an edge detector 621 may be present to detect edge pixels between a graphics shape, and surrounding video.

The G-criterion may be used to detect such boundaries (M. Mertens et al.: A robust nonlinear segment-edge finder, 1997 IEEE Workshop on Nonlinear Signal and Image Processing).

The G-criterion can be used when defining properties as desired (e.g. bright saturated colors contrasting with more plain natural object colors), and calculating their amount of co-occurrence in two regions. Since counting is involved, the shape of the regions can also be tuned as desired.

E.g., use the two chrominances of pixel colors, and define a first property:

$$P1 = 1000 * Cb + Cr$$

This property can be transformed under a further function, e.g. a deviation from a locally determined average chrominance-based property, e.g.

$$Delta\_P1 = P1\_pixel\ minus P1\_determined$$

$$P2 = Function(Delta\_P1)$$

The function may e.g. classify as zero if the Delta_value is below a first threshold, and from 1 to 9 for intermediate delta values, and 10 if the delta value is sufficiently different (i.e. abs(1000*Cb −1000*Cb_reference)>1000*Threshold1 or abs(Cr−Cr reference)>Threshold2).

One then defines two regions, e.g. two adjacent rectangles, which shift over the image, till they also fall left and right over e.g. a horizontal border of a ticker tape. The amount of shift can depend on the amount of match.

The G_criterion equals: G=sum, for all possible different values of P2, of the absolute value of: the number of pixels in rectangle 1 having any value P2_i (e.g. P2_0 means Red color component of the pixel being counted=0, P2_1 means Red=10, etc) minus the number of pixels in rectangle 2 having same value P2_i, and finally this sum of absolute differences is divided by a normalization factor being typically the number of pixels in both rectangles (or area-adjusted if the regions have unequal size). When comparing two equal sized test rectangles falling at adjacent positions in the image, the equation becomes:

$$G=\text{sum}\_i\{\text{abs}[\text{count}(P2\_i)\_\text{right\_rectangle}-\text{count}(P2\_i)\_\text{left rectangle}]\}/2*L*W \qquad [\text{Eq. 3}]$$

L and W are the length and width of the two rectangles

If the detector is inside the graphics, there will be largely the same colors in either rectangle, and we will see all zeros, i.e. no edge. If one rectangle falls on the graphics, e.g. saturated yellow, and the other side falls on the video, e.g. desaturated green (small green component excess), the running average coming from the (e.g. above green graphics) green side will be green, resulting in P2 values of approximately zero in the upper rectangle, and compared to that continuing green color, P2 values all being e.g. approximately 10 below in the other sampling rectangle. There will then be L*W different pixels in the left rectangle, approximately all zeroes, and L*W pixels with P2 property (e.g. having determined value 10 as input to the G-criterion) in the right rectangle, which different characteristic colors don't find a match on the left side I.e. the G-criterion will approximate the value 1 when falling on an edge. The benefit of the G-criterion is that one can add any property to compare, e.g. texture-based metrics etc. Other more classical edge detectors can be used alternatively, to find a set of candidate points on locations at the edge of a graphics area and the start of a natural video area. Edge detectors often have a property that they are noisy, i.e. there may be both gaps and spurious edge pixels. Thereto shape analyzer 622 may contain a preprocessing circuit to identify connected shapes in the HDR image from the found edge pixels. Various techniques are known to the image analysis skilled person, e.g. the Hough transform can be used to detect lines, circles can be matched, splines or snakes can be used etc. If the analysis reveals that 4 lines (or one line and the image boundaries) form a rectangle, in particular having specific properties like e.g. (exactly or approximately) as wide as the image and at the bottom, the interior colors are a good candidate of being graphics pixels (e.g. a ticker tape in a news show). So this entire rectangle may be added to second segmentation map SEGMAP_2. Symmetry determinations on the basis of a found boundary of an expected graphics may corroborate there actually being a primary graphics element. Simpler embodiments may e.g. focus only on a few simple geometrical elements, like a rectangle detected at the bottom of the image (which would often suffice to get a good first idea of the graphics range R_gr), and e.g. only if such an element is not found, the algorithm may search further for more a complex graphics object like e.g. a star-shape, a small area flying in, remaining for a few seconds over a few successive video shots, and then disappearing again (i.e. also take into account temporal variation behavior of graphics). Or on the contrary a candidate identified graphics region/object may remain particularly invariant over several different shots of the movie, etc. A gradient analyzer circuit 623 may further analyze situations of graphics which don't consist of a set of fixed colors, but have internal gradients (typically long-reach gradients, changing slowly over several tens or hundredths of pixels). I.e. such a gradient contains e.g. all yellow colors, but the saturation changes from left to right. It can positively verify some gradient is probably a graphics-generated gradient, or negatively verify. E.g., it may discard blue gradients in the upper part of the image as probably sky, in some embodiments depending on further geometric properties of the gradient, such as e.g. size of the gradient area, steepness of the gradient, amount of colors spanned by the gradient, and in particular again if the gradient again ends at a complex lower boundary (e.g. trees). In case of a blue line which might delineate water from sky, the pixels may be discarded if the position of this line is too much below the upper boundary of the image.

A pseudo-image analysis circuit 630 may provide further certainty regarding robust determined graphics pixels, in third segmentation map SEGMAP_3. Modem, more pleasing graphics may contain e.g. a shape with (graphics-generated) clouds in the lower banner, which almost looks like a natural image, and may therefore be confused. Even if correctly identified as graphics, it may not contribute significant new insights to the pixel lumas of the graphic as determinable from other parts of the graphics. If indeed it is part of the graphics, it will have coordinated colors anyway, which will roughly overlap with the otherwise determined graphics range R_gra, maybe leading to a somewhat higher upper luma Y_high or somewhat lower Y_low as determined, but the method is not that critical. Such regions attached to an identified graphics area, e.g. in a left lower corner of a banner rectangle, may be discarded again (or in advanced embodiments retained if verified to be an associated graphic element with the rest of the banner, e.g if it has related colors, but these pseudo-graphics can be complex, and then they may be better discarded). With the discarding one can obtain a more trustworthy segmentation map for the purpose of determining a suitable graphics range R_gra. More advanced embodiments may apply texture or pattern recognition algorithms to the special region under interest, i.e. not a (often geometrically simple like a rectangle or substantially circular, and often symmetrical) region of a few colors and their simple gradients (i.e. deviating to a saturation which is e.g. 20% less). E.g. a busy-ness measure can be calculated indicating how often and fast (e.g. which color change) pixel colors vary per area of e.g. 10×10 pixels. Calculating an angular spread of lines (e.g. centroids of objects with a small color variation) is another measure that can be useful to discriminate some complex patterns of nature (e.g. foliage) from simple geometric patterns as they occur in graphics (also text usually has only two or a few directions for the strokes). Simpler embodiments may calculate gradients. If there are short-range gradients (i.e. substantial variation over a few pixels, rather than the long-reach gradients often occurring in graphics (varying slowly over a few tens or hundredths of pixels), such a region can be excluded from the map for robustness reasons. Also if the colors in a region of the large-scale-surrounding geometry of the graphics region, e.g. a text box, are deviating a lot from the average colors of the rest of the graphics region, even if they are complementary colors (which means they may have been purposefully chosen for this graphic, e.g. blue to complement orange) the processing logic of circuit 630 may remove those pixels from the set ultimately determining the graphics range, i.e. remove those pixels from SEGMAP_3.

However many pixel region analysis sub-circuits or processes there are (more or less than the three exemplified), the final processing is typically performed by a luma histogram analysis circuit 650. This circuit will look at all the lumas of the pixels identified as primary graphics in the third segmentation map SEGMAP_3 (or any equivalent segmentation map, or mechanism). It will output an image-analysis-based lower luma Y_low_ima, which is at or around the lowest luma in a histogram of lumas of the pixels identified to be graphics in SEGMAP_3. If the luma histogram contains many dark colors, the output may be higher than the minimum, e.g. set as no lower than 10% of the highest luma, to have a pragmatic graphics range. If one the contrary only white graphics pixels were detected in the SEGMAP_3, instead of setting the lower and upper limit identical, which is not useful, the luma histogram analysis circuit 650 may output again a image-analysis-based lower luma Y_low_ima which is e.g. 25% of the image-analysis-based upper luma Y_high_ima (which as more important parameter is typically determined first; that may be the luma of e.g. the white text). Also Y_high_ima need not always be exactly the same as the maximum luma found in the SEGMAP_3. If e.g. only yellow colors are found, as brightest colors, knowing that they typically have a luminance of 90% of white, one may set as upper luma the luma for 110% of the luminance of the maximum luma found in the histogram. Or if a brighter colored logo co-exists with darker white subtitles, one may set a value corresponding to a white value suitable for the brightest primary graphics element.

Figure 7:
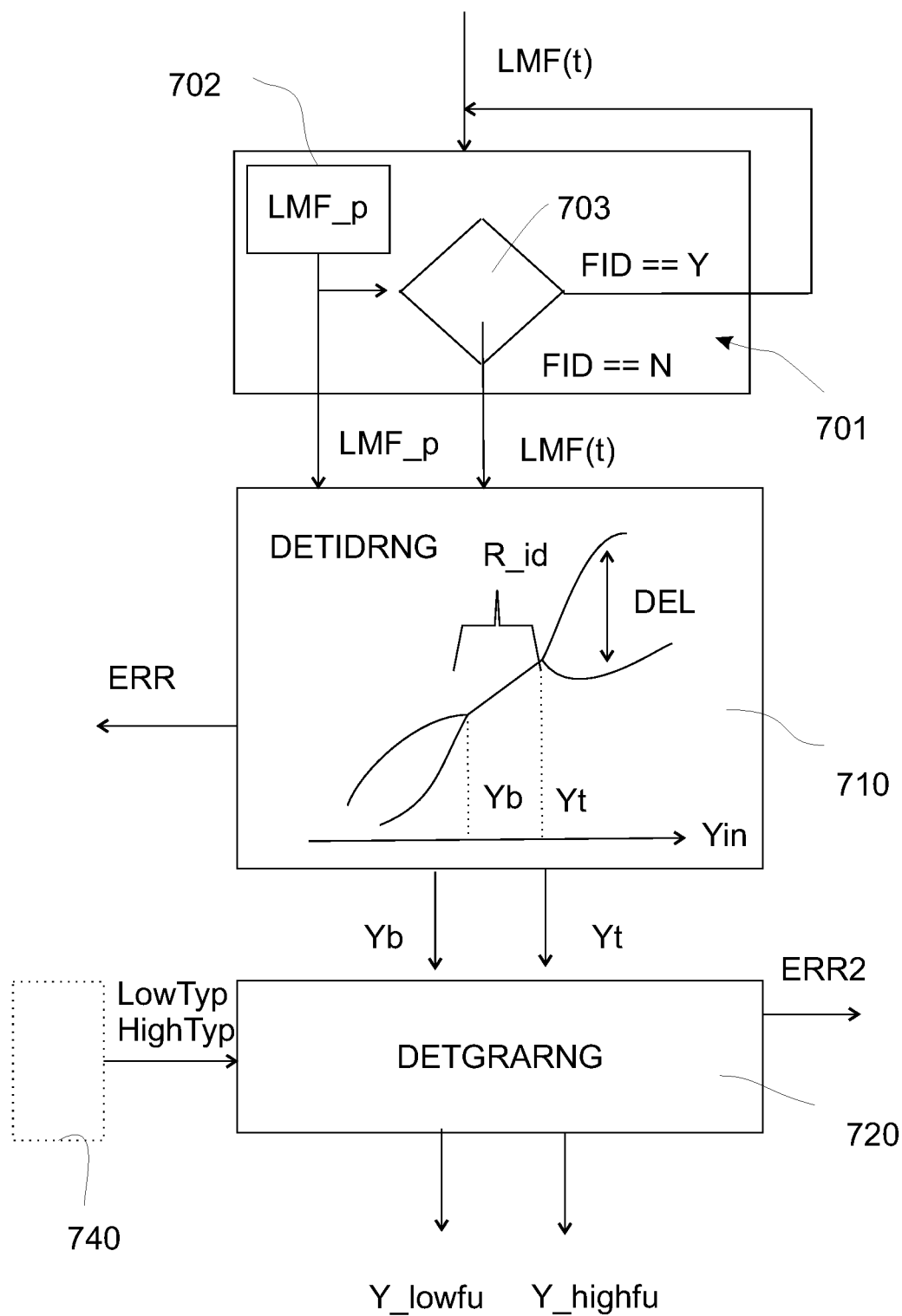
FIG. 7 schematically shows one possible embodiment of defining at least an upper and typically also a lower luma from at least two consecutive luma mapping functions formulated according to the principles elucidated with FIG. 3 or 4.
Figure 8:
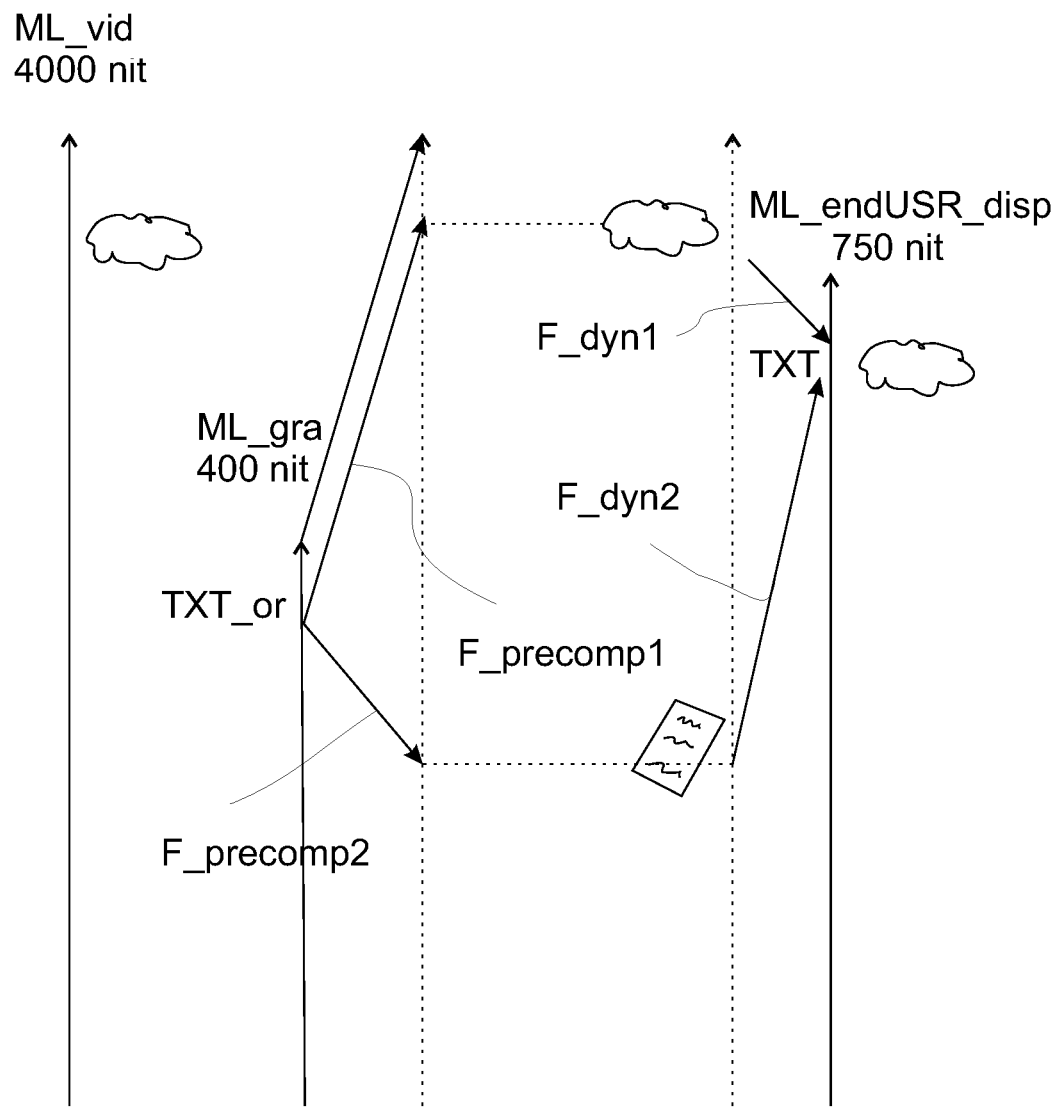
FIG. 8 explains a pre-compensation luminance mapping-based mixing of primary graphics with HDR video according to prior art.

Returning to FIG. 5, there may also be a luma mapping function analysis unit 512 to analyze regions of similarity of mapping functions (i.e. where a sub-set of lumas is mapped to the approximately the same corresponding output lumas by all different optimal image-dependent luminance mapping functions) for runs of (successive or neighboring) images of the video, of which an exemplary algorithm is explained with FIG. 7. I.e. any apparatus may have unit 511, or unit 512, or both, and then typically some circuitry to summarize the found graphic ranges, e.g. an overlap or junction. The same regarding unit 513.

Various luma mapping functions valid for certain moments in time (LMF(t)) are input into an identity analysis circuit 701. One or more previous luma mapping function LMF_p are taken from memory 702. If a differently shaped function is determined (i.e. the incoming LMF(t) has a different shape at least at some points than the stored LMF_p), it may either replace the old LMF_p, or supplement it when comparing more than two functions. Identity analysis circuit 701 is arranged to first check whether there is total identity of the function rather than in a sub-region of input lumas only. Several HDR codecs will send one function per image, and those functions may all have the same shape for all the images in one same scene, so those should be discarded, which is shown by the establisher 703 finding the identity Boolean FID to be "yes" or "1". Then simply the next function is read, until really a new function is read (e.g. the function for the dragon being the old one, and the one for the sunlit see of FIG. 3, 302 being the new one).

Sub-range identity circuit 710 calculates difference in output value DEL for substantially all the input luma values Y_in. It is supposed to find at least one outer region where there is a difference (e.g. below the graphics range), and an intermediate range R_id where there is output identity. It can determine a bottom luma Yb and top luma Yt of this range. These can be output as final lower and upper luma of the identified graphics range R_gra suitable for mixing secondary graphics, or not. Typically a graphics range determining circuit 720 may do further analysis, before it outputs function-determined lower luma Y_lowfu and function-determined upper luma Y_highfu. This may be based as explained on checking whether e.g. the upper luma falls in a typical range, i.e. is below typical upper HighTyp from (dotted ergo optional) range supply circuit 740. The same may happen regarding a typical lower luma LowTyp. If we have a 5000 nit master HDR image, finding a graphics range around 5000 nit is probably not a good graphics range, as those graphics were found to be too bright by several viewers. Embodiments can if analysis fails, e.g. the determined Yt lays far above HighTyp propose some averagely well working value for Y_highfu, but usually it will throw an error condition ERR2. Also, curves may be communicated which do not have a middle range of identity (R_id), in which case again an error condition may be thrown (first error condition ERR). We have shown for simplicity the graphics range to be exactly the same mapping for both curves for all points in that range, but in general this may be relaxed to be found similar if within a certain tolerance (e.g. 10% luminance deviation max.).

Returning to FIG. 5, in such a situation, consolidation logic circuitry 515 cannot use an input of lower and upper luma from luma mapping function analysis unit 512. In other cases, it may check the similarity of Y_highfu and Y_high_ima, and if they give a close value, it may use either value, or e.g. the average, as final upper luma value Y_high, etc. It may also directly use the metadata-based upper value Yhi as supplied by metadata extractor 513 (and if present also metadata lower luma Y_lo, which if not present can be replaced by a percentage of Y hi, e.g. ⅓ of the corresponding luminance L_hi_met), if present. In any case, at least an upper luma Y_high and typically also a lower luma Y_low will be communicated to graphic generating circuit 520, so that it can take these lumas into account when selecting (or transforming in case an already pre-created graphics element needs to be mixed) the colors of the secondary graphics element. As explained, it will determine a suitable graphics luma Y_gra for each pixel, so that it typically falls in the graphics range (R_gra), or not too far below or above. The actual value of Y_gra will depend on what the graphics pattern contains as pixel colors and lumas, e.g. if the darkest color (Y_orig_graph_min) is mapped to Y_low and the brightest color in a pre-existing or to be formulated graphics (Y_orig_graph_max) is mapped to Y_high, a pixel color in between Y_orig_graph_min and Y_orig_graph_max may be proportionally (or non-linearly) mapped in between Y_low and Y_high.

Finally image mixer 530 will mix the color of the graphics (with graphics pixel luminance Lgra, as mixing may oftentimes be more elegant in the linear domain, or graphics pixel luma Y_gra, e.g. if the mixing consists of simple pixel replacement) and the video pixel color, for (substantially) all pixels in the image.

There may be a luma mapper (533) present in some embodiments e.g. those that can mix in the output domain (some embodiments of the apparatus may have capability to only mix in the output domain, or only the input domain (potentially before a final luma mapping), or be able to do both and switch according to desiderata). If suitable graphics is mixed in the input domain, a luminance mapping function like the one for the dragon will still be applied to the secondary graphics pre-mixed image, and this function may be scaled for various different end-user displays with different end-user display maximum luminance capability. But with the present innovations, that graphics will be relatively stable, also when being subjected to further luminance mapping. But as said, we can also mix in the output domain of any function, i.e. the vertical axis of FIG. 3, but then the luminance mapper will know how to mix in the output graphics range, when knowing the luminance mapping function to be applied. The reader should still understand this is an upcoming dynamic mapping (which can change luminances or relative luminances significantly), not already applied, which makes blending easier. Typical applications will send the graphics as pre-adjusted to the output domain (can be coded e.g. in PQ), for e.g. the end-user tv to do the final blend.

The final mixed output image Im_out having for its pixels mixed luminances Lmix_fi (or typically the lumas coding them), will be supplied via image or video signal output 599.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements. The units of apparatuses in this teaching can in specific embodiments be formed by circuits on application specific integrated circuits (e.g. a color processing pipeline applying technical color modifications to incoming pixel colors like YCbCr), can be software-defined algorithms running on a CPU or GPU in e.g. a mobile phone, or run on an FPGA, etc. Typically the calculation hardware, be it generic bit processing calculators or specific digital processing units will under control of operating command be connected to memory units which may be onboard certain circuits, or off-board, connected via digital buses, etc. Some of those calculators may be directly connected to larger apparatuses, such as e.g. a panel controller of a display, or a hard disk controller for longer time storage, etc., or connection to physical media like e.g. a blu-ray disk or a USB stick. Some of the functionality may be distributed over various apparatuses via a network, e.g. some calculations may be performed on servers in the cloud, etc.

The invention claimed is:

1. A method of determining in a circuit for processing digital images second lumas of pixels of a secondary graphics image element (216) to be mixed with at least one high dynamic range input image (206), the method comprising:
   receiving a high dynamic range image signal (S im) comprising the at least one high dynamic range input image, characterized in that the method comprises:
   analyzing the high dynamic range image signal to determine a range of primary graphics lumas (R gra) of a primary graphics element of the at least one high dynamic range input image, which is a sub-range of a range of luminances of the high dynamic range input image,
   wherein the determining a range of primary graphics lumas comprises determining a lower luma (Y low) and an upper luma (Y_high) specifying endpoints of the range of primary graphics lumas (R_gra);
   luminance mapping secondary graphics element with at least a brightest subset of its pixel lumas comprised in the range of graphics lumas; and
   mixing the secondary graphics image element with the high dynamic range input image.

2. The method as claimed in claim 1,
   wherein the analyzing comprises:
   detecting at least one primary graphics elements in the high dynamic range input image;
   establishing the lumas of pixels of the at least one primary graphics elements; and
   summarizing the lumas as the lower luma and the upper luma,
   wherein the lower luma is lower than all or a majority of the lumas of pixels of the at least one primary graphics element,
   wherein the higher luma is higher than all or a majority of the lumas of pixels of the at least one primary graphics elements.

3. The method as claimed in claim 1,
   wherein the high dynamic range image signal comprises metadata,
   wherein the analyzing comprises reading a value of the lower luma and the upper luma from the metadata.

4. The method as claimed in claim 1,
   wherein the high dynamic range image signal comprises metadata,
   wherein the analyzing comprises:
   reading two or more luma mapping functions associated with temporally successive images from the metadata; and
   establishing the range of graphics lumas as a range which fulfills a first condition regarding the two or more mapping functions,
   wherein the two or more luma mapping functions map input lumas in this range of graphics to corresponding output lumas,
   wherein the first condition is that for each input luma its corresponding two or more output lumas are substantially the same.

5. The method as claimed in claim 4,
wherein the range of graphics lumas satisfies the verification of a second condition of falling within a secondary range of suitable graphics lumas,
wherein the maximum of the secondary range must be lower than a pre-fixed percentage of a maximum of a range of mixing image and graphics.

6. The method as claimed in claim 1, further comprising luma mapping the pixel lumas of the at least one high dynamic range input image to corresponding output lumas of at least one corresponding output image,
wherein the high dynamic range image signal comprises metadata,
wherein the mixing happens in the at least one corresponding output image by mapping the pixel lumas with at least one luma mapping function obtained from the metadata.

7. The method as claimed in claim 1, further comprising determining the secondary graphics image element with a set of colors spanning a scale of colors of different lightness,
wherein a portion of the scale of colors of different lightness appear to the human eye above-average light,
wherein a portion of the scale of colors of different lightness appear below-average dark,
wherein at least the above-average light colors are mixed into the at least one high dynamic range input image with lumas in the range of graphics lumas.

8. The method as claimed in claim 7,
wherein the determining of the set of colors comprises selecting a limited set of relatively bright below-average dark colors,
wherein the relatively bright below-average dark colors have lumas above a secondary lower luma,
wherein the secondary lower luma is higher than 70% of the lower luma.

9. The method as claimed in claim 1, wherein the mixing consists of pixel replacement or blending with a percentage of less than 50% of a pixel luminance of the at least one high dynamic range input image.

10. An apparatus (500) for determining second lumas of pixels of a secondary graphics image element (216) and mixing the secondary graphics image element with at least one high dynamic range input image (206) which comprises a primary graphics element (207), the apparatus comprising:
an input (501) for receiving a high dynamic range image signal (S_im) comprising the at least one high dynamic range input image;
an image signal analysis circuit (510) arranged to analyze the high dynamic range image signal to determine a range of graphics lumas (R_gra) of the at least one high dynamic range input image which is a range specifying lumas of pixels representing primary graphics,
which is a sub-range of a range of luminances of the high dynamic range input image,
wherein the determining a range of graphics lumas comprises determining a lower luma (Y_low) and an upper luma (Y high) specifying endpoints of the range of primary graphics lumas (R gra);
a graphic generating circuit (520) arranged to generate or read the secondary graphics element, and luminance map it with at least a brightest subset of its pixel lumas comprised in the range of graphics lumas;
an image mixer (530) arranged to mix the secondary graphics image element with the high dynamic range input image, yielding pixels with mixed luminances (Lmax fi); and
an output (599) for outputting at least one mixed image (Im_out) which comprises the pixels with mixed luminances (Lmax_fi).

11. The apparatus as claimed in claim 10,
wherein the image signal analysis circuit comprises an image graphics analysis circuit,
wherein the image graphics analysis circuit is arranged to detect at least one primary graphics elements in the high dynamic range input image,
wherein the image graphics analysis circuit is arranged to establish the lumas of pixels of the at least one primary graphics elements, and
wherein the image graphics analysis circuit is arranged to summarize the lumas as the lower luma and the upper luma,
wherein the lower luma is lower than all or a majority of the lumas of pixels of the at least one primary graphics elements,
wherein the higher luma is higher than all or a majority of the lumas of pixels of the at least one primary graphics elements.

12. The apparatus as claimed in claim 10,
wherein the high dynamic range image signal comprises metadata,
wherein the image signal analysis circuit comprises a metadata extraction circuit,
wherein the metadata extraction circuit is arranged to read a value of the lower luma and the upper luma from the metadata.

13. The apparatus as claimed in claim 10,
wherein the high dynamic range image signal comprises metadata,
wherein the image signal analysis circuit comprises a luma mapping function analysis circuit,
wherein the luma mapping function analysis circuit is arranged to read two or more luma mapping functions of temporally successive images from the metadata
wherein the luma mapping function analysis circuit is arranged to establish the range of graphics lumas as a range which fulfills a first condition regarding the two or more luma mapping functions,
wherein the two or more luma mapping functions map input lumas in this range of graphics to corresponding output lumas,
wherein the first condition is that for each input luma its corresponding two or more output lumas are substantially the same.

14. The apparatus as claimed in claim 10,
wherein the image mixer circuit comprises a luma mapper circuit,
wherein the luma mapper circuit is arranged to map lumas of pixels of the at least one high dynamic range input image to corresponding output lumas of at least one corresponding output image which has a dynamic range,
wherein the high dynamic range image signal comprises metadata,
wherein the luma mapper circuit is arranged to perform the mixing in the at least one corresponding output image,
wherein the mixing is in accordance with at least one luma mapping function obtained from the metadata.

15. The apparatus as claimed in claim 10,
wherein the graphic generating circuit is arranged to design the secondary graphics image element with a set of colors spanning a scale of colors of different lightness, wherein a portion of the scale of colors of different lightness appear to the human eye above-average light, wherein a portion of the scale of colors of different lightness appear below-average dark, wherein at least the above-average light colors are mixed into the at least one high dynamic range input image with lumas in the range of graphics lumas.

16. The apparatus as claimed in claim 10, wherein the image mixer circuit is arranged to mix using pixel replacement of a video pixel of the at least one high dynamic range input image by a secondary graphics element pixel, or blending with a percentage of less than 50% of a pixel luminance of the at least one high dynamic range input image.

* * * * *